(12) United States Patent
Kurylak et al.

(10) Patent No.: US 12,537,604 B2
(45) Date of Patent: Jan. 27, 2026

(54) TECHNIQUES TO FACILITATE AUTOMATIC GAIN CONTROL FOR AN OPTICAL RECEIVER

(71) Applicant: Cisco Technology, Inc., San Jose, CA (US)

(72) Inventors: Alexander C. Kurylak, Nazareth, PA (US); Sanjay Sunder, Allentown, PA (US); Pratiksh Parikh, Macungie, PA (US); Jenjen Tiao, Allentown, PA (US); Bibhu P. Das, Philadelphia, PA (US); Kadaba Lakshmikumar, Hillsborough, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 253 days.

(21) Appl. No.: 18/521,401

(22) Filed: Nov. 28, 2023

(65) Prior Publication Data

US 2025/0175257 A1     May 29, 2025

(51) Int. Cl.
*H04B 10/06*     (2006.01)
*H04B 10/69*     (2013.01)

(52) U.S. Cl.
CPC .............................. *H04B 10/6931* (2013.01)

(58) Field of Classification Search
CPC  H04B 10/6931; H04B 10/671; H04B 10/672; H04B 10/40; H04B 10/0795; H04B 10/07955; H04B 10/693; H04B 10/2057; H04B 10/572; H04B 10/6971; H04B 10/6972; H04B 10/616; H03G 3/30
USPC ....... 398/202, 203, 204, 205, 206, 207, 208, 398/209, 210, 211, 212, 213, 214, 135, (Continued)

(56) References Cited

U.S. PATENT DOCUMENTS 6,411,429 B1    6/2002  Tomofuji et al.
10,020,879 B2 *  7/2018  Saito ................... H04B 10/572
10,171,057 B1 *  1/2019  Ahmed ..................... H03F 3/08
(Continued)

OTHER PUBLICATIONS

Chow H-C., et al., "High Performance Automatic Gain Control Circuit using a S/H Peak-Detector for ASK Receiver", 9th International Conference on Electronics, Circuits and Systems, IEEE, Sep. 15-18, 2002, 4 pages.

(Continued)

*Primary Examiner* — Hanh Phan
(74) *Attorney, Agent, or Firm* — Edell, Shapiro & Finnan, LLC

(57) ABSTRACT

Provided herein are techniques to facilitate automatic gain control for an optical receiver. In one example, a method may include for a first mode, first adjusting, for a received optical input signal, at least one of: a coarse gain of a programmable gain amplifier (PGA), a fine gain of the PGA, or an attenuation of a variable optical attenuator (VOA) until a voltage swing peak value of an output signal of the optical receiver satisfies a first voltage swing peak range. The method may further include, through a second mode, triggering second adjusting of at least one of the VOA attenuation or the PGA fine gain based on determining that the voltage swing peak value of the output signal does not satisfy a second voltage swing peak range or that another voltage swing peak value obtained from an external signal processing device does not satisfy another voltage swing peak range.

20 Claims, 14 Drawing Sheets

(58) Field of Classification Search
USPC ......... 398/136, 158, 159, 33, 38, 25, 26, 27, 398/137, 138, 139
See application file for complete search history.

(56) References Cited

U.S. PATENT DOCUMENTS

| | | | |
|---|---|---|---|
| 11,223,385 B1 * | 1/2022 | Murakami | ............. H04B 10/60 |
| 2004/0197105 A1 | 10/2004 | Khatana et al. | |
| 2013/0343751 A1 | 12/2013 | Mamyshev | |
| 2016/0141834 A1 | 5/2016 | Teranishi | |
| 2022/0109503 A1 | 4/2022 | Mazzini et al. | |
| 2022/0231646 A1 | 7/2022 | Wu et al. | |

OTHER PUBLICATIONS

Rouphael T.J., "Wireless 101: Automatic Gain Control (AGC)", EE Times, RF Microwave Designline, Feb. 25, 2009, 17 Pages.

Stojanovic N., "An Algorithm for AGC Optimization in MLSE Dispersion Compensation Optical Receivers", IEEE Transactions on Circuits and Systems-I: Regular Papers, vol. 55, No. 9, Oct. 2008, 7 pages.

Stojanovic N., et al., "On the Design of AGC Circuits in IM-DD NRZ Optical Transmission Systems", Journal of Lightwave Technology, vol. 26, No. 20, Oct. 15, 2008, 8 pages.

* cited by examiner

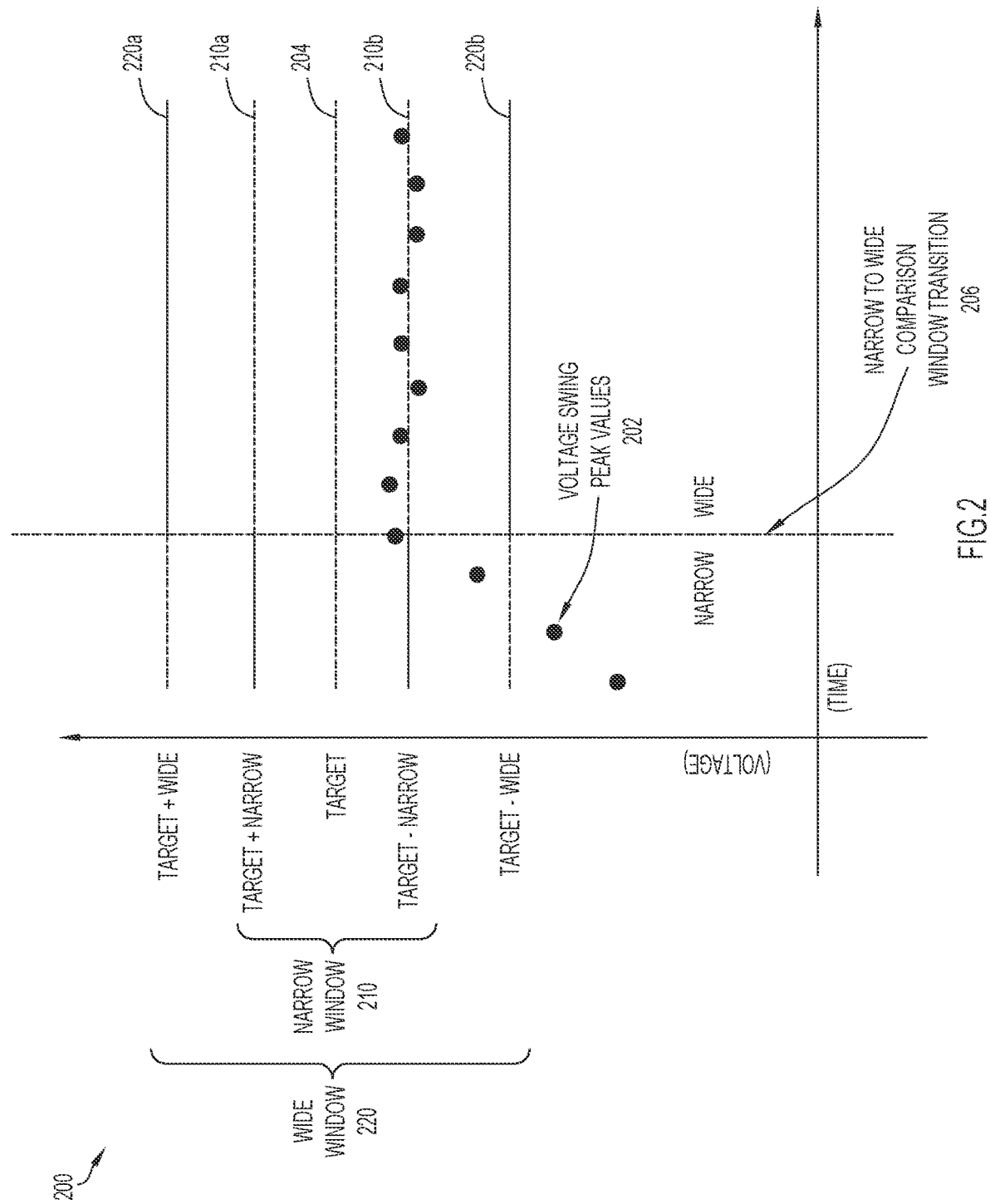

300

302 — FOR A FIRST OPERATIONAL MODE OF AN OPTICAL RECEIVER, FIRST ADJUSTING, BY A CONTROLLER FOR A RECEIVED OPTICAL INPUT SIGNAL, AT LEAST ONE OF: A COARSE GAIN OF A PGA, A FINE GAIN OF THE PGA, OR AN ATTENUATION OF A VOA UNTIL A VOLTAGE SWING PEAK VALUE OF AN OUTPUT SIGNAL OF THE OPTICAL RECEIVER SATISFIES A FIRST VOLTAGE SWING PEAK RANGE THAT IS BASED ON A TARGET VOLTAGE SWING PEAK VALUE, IN WHICH THE OUTPUT SIGNAL OF THE OPTICAL RECEIVER IS DERIVED FROM AN OUTPUT OF THE PGA AND THE OUTPUT SIGNAL IS PROVIDED TO AN EXTERNAL SIGNAL PROCESSING DEVICE

304 — UPON THE VOLTAGE SWING PEAK VALUE OF THE OUTPUT SIGNAL OF THE OPTICAL RECEIVER SATISFYING THE FIRST VOLTAGE SWING PEAK RANGE, THE METHOD MAY INCLUDE MAINTAINING THE COARSE GAIN OF THE PGA AND PERFORMING, BY THE CONTROLLER, OPERATIONS FOR A SECOND OPERATIONAL MODE, INCLUDING:

304-1 — TRIGGERING SECOND ADJUSTING OF AT LEAST ONE OF THE ATTENUATION OF THE VOA OR THE FINE GAIN OF THE PGA BASED ON ONE OF:

DETERMINING THAT THE VOLTAGE SWING PEAK VALUE OF THE OUTPUT SIGNAL DOES NOT SATISFY A SECOND VOLTAGE SWING PEAK RANGE, OR

DETERMINING THAT AN EXTERNAL VOLTAGE SWING PEAK VALUE OBTAINED BY THE CONTROLLER FROM AN EXTERNAL SIGNAL PROCESSING DEVICE DOES NOT SATISFY AN EXTERNAL VOLTAGE SWING PEAK RANGE THAT IS OBTAINED BY THE CONTROLLER FROM THE EXTERNAL SIGNAL PROCESSING DEVICE; OR

MAINTAINING THE ATTENUATION OF THE VOA AND THE FINE GAIN OF THE PGA IF NO SECOND ADJUSTING IS TRIGGERED FOR THE CONTROLLER

FIG.3

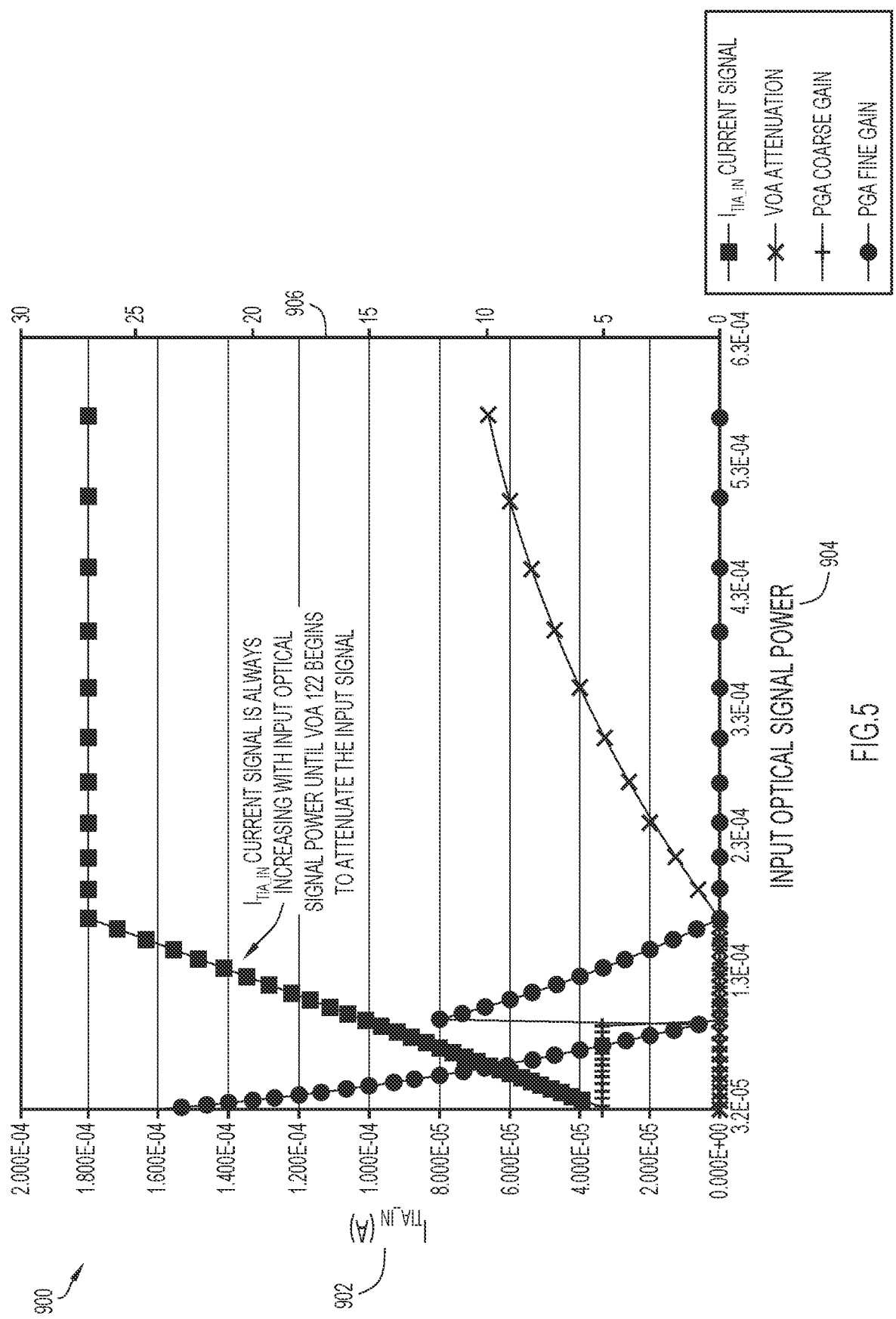

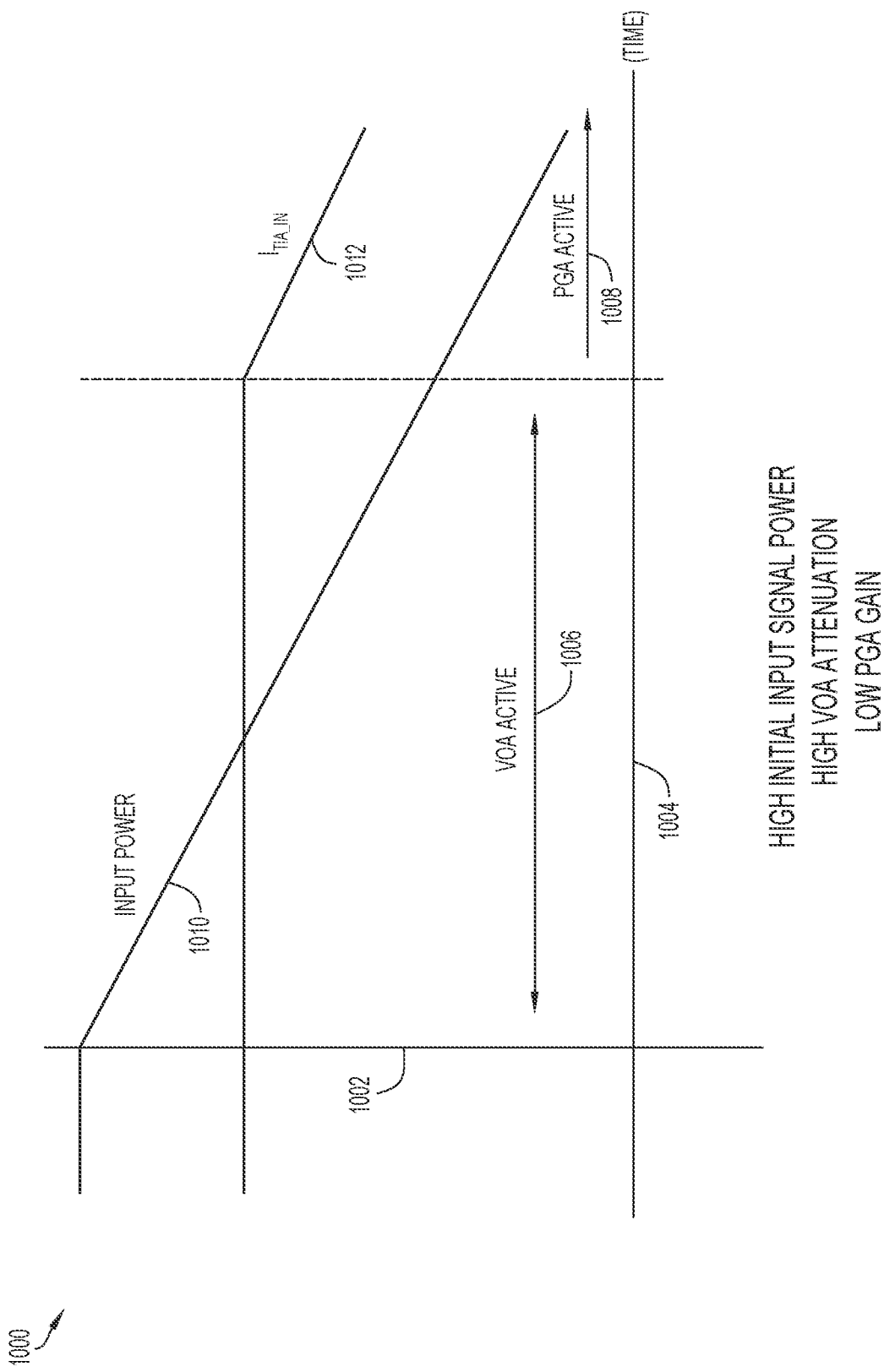

TECHNIQUES TO FACILITATE AUTOMATIC GAIN CONTROL FOR AN OPTICAL RECEIVER

TECHNICAL FIELD

The present disclosure relates to amplifier circuitry for optical equipment.

BACKGROUND

A transimpedance amplifier (TIA) is a circuit block useful for optical receivers that converts an optical signal/current into a voltage signal for further processing. In multi-chip receiver systems in which programmable gain elements are provided on one chip and an analog to digital converter (ADC) is provided on another chip, it can be difficult to provide an automatic gain control (AGC) loop between the two chips, as such an AGC loop can be slow and difficult to control, especially without dedicated feedback lines between the two chips.

BRIEF DESCRIPTION OF THE DRAWINGS

FIG. 2 is a plot illustrating example details for voltage swing peak windows that may be utilized in conjunction with AGC operations that may performed by a controller of the optical receiver of FIG. 1, according to an example embodiment.

FIG. 3 is a flow chart depicting a method associated with operations that may be performed to facilitate AGC for the optical receiver of FIG. 1, according to an example embodiment.

FIG. 5 is a plot illustrating example behavior of a current signal of the optical receiver of FIG. 1 that can be realized through operations performed for the calibration algorithm, according to an example embodiment.

FIGS. 6A, 6B, 6C, and 6D are example waterfall plots illustrating example behavior of an input current signal for a transimpedance amplifier.

DETAILED DESCRIPTION

Overview

Figure 1:
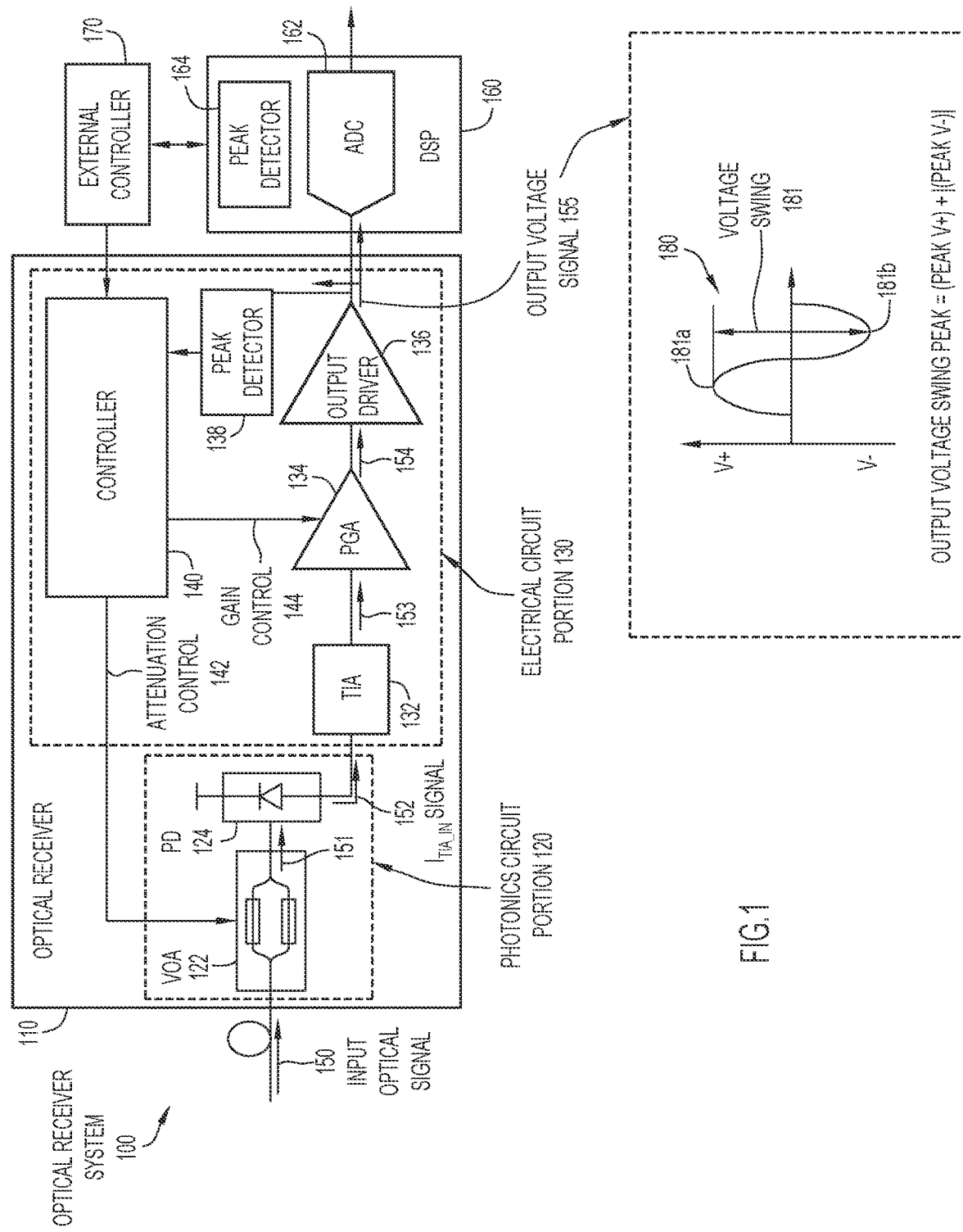
FIG. 1 is a block diagram of an optical receiver system including an optical receiver for which automatic gain control (AGC) is provided, according to an example embodiment.

Embodiments herein may facilitate automatic gain control (AGC) for an optical receiver in order to optimize or maximize the signal-to-noise ratio (SNR) of an output voltage signal generated by the optical receiver for all powers of an input optical signal received by the optical receiver.

In one form a method is provided that may include operating an optical receiver comprising a variable optical attenuator (VOA) that receives an optical input signal, a transimpedance amplifier (TIA), a programmable gain amplifier (PGA), and a controller, in which the method may include a first operational mode, referred to herein as a calibration mode, and a second operational mode, referred to herein as a mission mode. A third operational mode, referred to herein as a recalibration mode, may be triggered within the second operational mode.

For the first operational mode, the method may include first adjusting, by the controller for the received optical input signal, at least one of: a coarse gain of the PGA, a fine gain of the PGA, or an attenuation of the VOA until a voltage swing peak value of an output signal of the optical receiver satisfies a first voltage swing peak range that is based on a target voltage swing peak value, wherein the output signal of the optical receiver is derived from an output of the PGA and the output signal is provided to an external signal processing device.

Upon the voltage swing peak value of the output signal of the optical receiver satisfying the first voltage swing peak range, the method may include maintaining the coarse gain of the PGA and performing, by the controller, operations for the second operational mode, which may include triggering second adjusting of at least one of the attenuation of the VOA or the fine gain of the PGA based on one of: determining that the voltage swing peak value of the output signal does not satisfy a second voltage swing peak range that is based on the target voltage swing peak value; or determining (e.g., via the third operational mode) that an external voltage swing peak value obtained by the controller from the external signal processing device does not satisfy an external voltage swing peak range that is obtained by the controller from the external signal processing device. For the second operational mode, the method may include maintaining the attenuation of the VOA and the fine gain of the PGA if no second adjusting is triggered for the second operational mode.

In at least one instance for the first operational mode, the first adjusting comprises adjusting the attenuation of the VOA before adjusting gain of the PGA. In at t least one instance, based on the voltage swing peak value of the output signal being less than a lower bound of the first voltage swing peak range, the first adjusting comprises decreasing the attenuation of the VOA to a smallest allowable level before increasing the gain of the PGA. In at least one instance, based on the voltage swing peak value of the output signal being greater than an upper bound of the first voltage swing peak range, the first adjusting comprises increasing the attenuation of the VOA to a highest allowable level before decreasing the gain of the PGA.

In at least one instance, the method may further include, for the first operational mode, determining, by the controller that the voltage swing peak value of the output signal satisfies the first voltage swing peak range for a threshold number of iterations of a first operational processing loop performed for the first operational mode before performing the operations for the second operational mode. In at least one instance, if the coarse gain of the PGA or the fine gain of the PGA is adjusted for an iteration of the first operational processing loop, a subsequent iteration of the first operational processing loop is performed following a first delay; or if the attenuation of the VOA is adjusted for an iteration of the first operational processing loop, a subsequent iteration of the first operational processing loop is performed following a second delay; and the first delay is less than the second delay.

In at least one instance, the operations of the second operational mode are performed through a second operational processing loop and wherein: if the fine gain of the PGA is adjusted for an iteration of the second operational processing loop, a subsequent iteration of the second operational processing loop is performed following a first delay; or if the attenuation of the VOA is adjusted for an iteration of the second operational processing loop, a subsequent iteration of the second operational processing loop is performed following a second delay; and the first delay is less than the second delay.

In at least one instance, the method may further include, for the operations of the second operational mode, the second voltage swing peak range is larger than the first voltage swing peak range for an initial iteration of the second operational processing loop for which the second adjusting has been triggered and, for subsequent iterations of the second operational processing loop for which the second adjusting is triggered, the second voltage swing peak range is the same as the first voltage swing peak range. In at least one instance, upon triggering the second adjusting of at least one of the attenuation of the VOA or the fine gain of the PGA, the second adjusting includes decreasing the attenuation of the VOA to a smallest allowable level before increasing the fine gain of the PGA based on determining that the voltage swing peak value of the output signal is less than a lower bound of the second voltage swing peak range in which the second voltage swing peak range is the same as the first voltage swing peak range. In at least one instance, upon triggering the second adjusting of at least one of the attenuation of the VOA or the fine gain of the PGA, the second adjusting includes decreasing the fine gain of the PGA to a smallest allowable level before increasing the attenuation of the VOA based on determining that the voltage swing peak value of the output signal is greater than an upper bound of the second voltage swing peak range in which the second voltage swing peak range is the same as the first voltage swing peak range.

In at least one instance, external signal processing device is a digital signal processing device that receives the output signal from the optical receiver and the external voltage swing peak range is set by the digital signal processing device and obtained by the controller during the operations for the second operational mode. In at least one instance, based on determining that the external voltage swing peak value obtained from the external signal processing device does not satisfy the external voltage swing peak range, the method further comprises performing, by the controller, operations for a third operational mode, comprising: adjusting at least one of the attenuation of the VOA or the fine gain of the PGA; and determining an updated voltage peak swing value of the output signal of the optical receiver following a first delay or a second delay, wherein the first voltage swing peak range and the second voltage swing peak range are based on the updated voltage swing peak value. In at least one instance, the first delay is utilized if the fine gain of the PGA is adjusted, the second delay utilized if the attenuation of the VOA is adjusted, and the first delay is less than the second delay.

In one form, an optical receiver is provided, the optical receiver comprising: an optical circuit portion comprising a variable optical attenuator (VOA) connected with a photodetector, wherein the VOA receives an optical input signal; an electrical circuit portion comprising a transimpedance amplifier (TIA) that is connected to an output of the photodetector, a programmable gain amplifier (PGA) connected to an output of the TIA, and an output driver connected to an output of the PGA that is to generate an output signal of the optical receiver that is to be provided to an external signal processing device; and a controller that is to manage an attenuation of the VOA and at least one of a coarse gain of the PGA or a fine gain of the PGA, wherein the controller comprises at least one memory element for storing data and at least one processor for executing instructions associated with the data, wherein executing the instructions causes the controller to perform operations, comprising: for a first operational mode, first adjusting, by the controller for the received optical input signal, at least one of: a coarse gain of the PGA, a fine gain of the PGA, or an attenuation of the VOA until a voltage swing peak value of an output signal of the optical receiver satisfies a first voltage swing peak range that is based on a target voltage swing peak value; and upon the voltage swing peak value of the output signal of the optical receiver satisfying the first voltage swing peak range, maintaining the coarse gain of the PGA and performing, by the controller, operations for a second operational mode, comprising: triggering second adjusting of at least one of the attenuation of the VOA or the fine gain of the PGA based on one of: determining that the voltage swing peak value of the output signal does not satisfy a second voltage swing peak range that is based on the target voltage swing peak value; or determining that an external voltage swing peak value obtained by the controller from the external signal processing device does not satisfy an external voltage swing peak range that is obtained by the controller from the external signal processing device; or maintaining the attenuation of the VOA and the fine gain of the PGA if no second adjusting is triggered for the second operational mode.

In one form, one or more non-transitory computer readable storage media encoded with instructions are provided that, when executed by a controller of an optical receiver, cause the controller to perform operations, comprising for a first operational mode, first adjusting, by the controller for the received optical input signal, at least one of: a coarse gain of a programmable gain amplifier (PGA), a fine gain of the PGA, or an attenuation of a variable optical attenuator (VOA) until a voltage swing peak value of an output signal of the optical receiver satisfies a first voltage swing peak range that is based on a target voltage swing peak value, wherein the output signal of the optical receiver is derived from an output of the PGA and the output signal is provided to an external signal processing device; and upon the voltage swing peak value of the output signal of the optical receiver satisfying the first voltage swing peak range, maintaining the coarse gain of the PGA and performing, by the controller, operations for a second operational mode, comprising: triggering second adjusting of at least one of the attenuation of the VOA or the fine gain of the PGA based on one of:

determining that the voltage swing peak value of the output signal does not satisfy a second voltage swing peak range that is based on the target voltage swing peak value; or determining that an external voltage swing peak value obtained by the controller from the external signal processing device does not satisfy an external voltage swing peak range that is obtained by the controller from the external signal processing device; or maintaining the attenuation of the VOA and the fine gain of the PGA if no second adjusting is triggered for the second operational mode.

Example Embodiments

Presented herein are techniques for controlling an optical receiver including a variable optical attenuator (VOA) and programmable gain amplifiers (PGA) that are provided on an integrated circuits (IC) or ICs that are separate from an external analog to digital converter (ADC). The VOA and PGA of the optical receiver can be controlled by firmware, such as a controller, of the optical receiver in order to optimize the incident signal swing on the ADC.

More specifically, in accordance with embodiments herein, an AGC loop is provided for an optical receiver system that combines the simplicity of local control of attenuation and gain for an optical attenuation stage and an electrical amplification stage of an optical receiver, via a controller provided for the optical receiver, with the accuracy and flexibility of additional control aspects that can be directed by an external ADC.

As managed by the controller of the optical receiver, the AGC loop can be operated to continuously optimize the signal-to-noise ratio (SNR) of an output voltage signal generated by the optical receiver by controlling the appropriate attenuation/gain stages and also by using independent, programmable loop update times for the different controlled attenuation/gain blocks of the optical receiver in order to optimize loop speed while maintaining stability. Because the controller of the optical receiver is used to close the loop, different parameters for the loop can be configured and/or reconfigured in order to facilitate a high level of loop control and performance optimization for the optical receiver system.

Referring to FIG. 1, FIG. 1 illustrates an optical receiver system 100 including an optical receiver 110 for which AGC is provided, according to an example embodiment. In at least one embodiment, the optical receiver system 100 may further include a digital signal processor (DSP) 160 that is external to the optical receiver 110 in which the DSP 160 is managed by an external controller 170. The DSP 160 may include an ADC 162 and a peak detector 164.

In at least one embodiment, the optical receiver 110 includes a photonics circuit portion 120 and an electrical circuit portion 130. In at least one embodiment, the photonics circuit portion 120 of the optical receiver 110 may include a variable optical attenuator (VOA) 122 and a photodiode (photodetector or PD) 124. In at least one embodiment, the electrical circuit portion 130 may include a transimpedance amplifier (TIA) 132, a programmable gain amplifier (PGA) 134, an output driver 136, a peak detector 138, and a controller 140. In at least one embodiment, optical receiver 110 may be provided via an IC chip or package in which the photonics circuit portion 120 may be configured via a first IC of the optical receiver chip/package and the electrical circuit portion 130 including the controller 140 may be configured via a second IC of the optical receiver chip/package.

As shown in FIG. 1, the VOA 122 has an input that is coupled to an input of the optical receiver 110 (package/chip). An output of the VOA is coupled to an input of the PD 124, and an output of the PD 124 is coupled to an input of the TIA 132. An output of the TIA 132 is coupled to an input of the PGA 134, and an output of the PGA 134 is coupled to an input of the output driver 136. The output driver 136 has an output that is coupled to an input of the peak detector 138 and that is coupled to an output of the optical receiver 110 (package/chip). The output of the optical receiver 110 is coupled to an input of the DSP 160 and, more specifically, to an input of the ADC 162 in which the ADC can generate an output signal (not shown) that can be provided to other circuitry and/or another device to which the optical receiver system 100 may be coupled/connected.

As further shown in FIG. 1, the external controller 170 may interface with the DSP 160 and may also interface with the controller 140 of the optical receiver 110 (e.g., via any input/output (I/O) connections provided for the optical receiver 110/controller 140 in which the external controller 170 can provide feedback information to the controller 140 during operation of the optical receiver system 100, as discussed in further detail herein, below. The controller 140 may further interface with the peak detector 138 to receive voltage swing peak information during operation of the optical receiver system 100. Further, the controller 140 may interface with the VOA 122, as generally shown at 142, in order to control attenuation of the VOA 122 during operation of the optical receiver system 100 and may interface with the PGA 134, as generally shown at 144, in order to control fine gain and/or coarse gain of the PGA 134 during operation of the optical receiver system 100.

Generally during operation of the optical receiver system 100, the optical receiver 110, via the VOA 122 is to receive an input optical signal (light), shown at reference numeral 150. The input optical signal 150 can be attenuated by the VOA 122 by an amount of attenuation that is controlled by the controller 140 in order to a generate an output optical signal, as shown at reference numeral 151, that is received by the PD 124. In at least one embodiment, attenuation for the VOA 122 can be set for both different optical polarization modes, such as a transverse electric (TE) mode and a transverse magnetic (TM) mode. In at least one embodiment, an attenuation step size of 1 decibel (dB) can be configured for attenuation adjustments that may be provided for the VOA 122 by the controller 140, however, it is to be understood that any attenuation step size can be configured for the optical receiver 110 in accordance with embodiments herein.

The PD 124 can detect the optical signal (light, 151) received from the VOA 122 and generate an electrical current signal that is an input provided to the TIA 132, referred to herein as '$I_{TIA\_IN}$', as shown at reference numeral 152. The TIA 132 converts the electrical current signal to an electrical voltage signal, as shown at reference numeral 153, that is provided to the PGA 134.

The electrical voltage signal 152 can be amplified by the PGA 134 by an amount of fine gain and/or coarse gain that is controlled by the controller 140 in order to generate an intermediate output voltage signal, as shown at reference numeral 154, that is provided to the output driver 136. In some embodiments, the PGA 134 may include multiple gain stages that can be controlled by the controller 140 in order to vary an amount of fine gain and/or coarse gain that is to be applied to the received electrical voltage signal 153. In at least one embodiment, a fine gain step size of 0.5 dB and a coarse gain step size of 5 dB may be provided for the PGA 134 by the controller 140, however, it is to be understood that any fine gain step size and/or coarse gain step size can be configured for the optical receiver 110 in accordance with embodiments herein.

The output driver 136 may be a device having a differential output impedance (e.g., 100 ohm) that matches a differential input impedance of the ADC 162 in which the output driver 136 applies a fixed gain to the intermediate output voltage signal 154 in order to generate an output voltage signal of the optical receiver 110, as shown at reference numeral 155. Thus, the output voltage signal 155 is derived from the intermediate output voltage signal 154 based on the fixed gain applied by the output driver 136. The output voltage signal 155 can also be provided to the peak detector 138 in order to facilitate various AGC operations for the optical receiver 110, as discussed in further detail below.

Also shown in FIG. 1 is an example plot 180 that illustrates general voltage features of the output voltage signal 155 that can be generated during operation of the optical receiver 110. As shown for the example plot 180, the output voltage signal 155 is a differential voltage signal having a positive voltage component (V+) and a negative voltage component (V−) such that the output voltage signal 155 has a voltage swing, as shown via reference numeral 181. During operation, the peak detector 138 determines a voltage swing peak value for the output voltage signal 155, which can be characterized as the sum of a maximum or peak positive voltage component of the output voltage signal 155, as shown at reference numeral 181a, and the absolute value of a maximum or peak negative voltage component of the output voltage signal 155, as shown at reference numeral 181b. In at least one embodiment, peak detector 138 captures the maximum value of a multi-level (e.g., pulse-amplitude modulation (PAM) signal via output voltage signal 155 in order to determine different voltage swing peak values of the signal during operation of the optical receiver.

In accordance with embodiments herein, dynamic AGC operations provided for the optical receiver 110 may include the controller 140 performing control loop operations that can utilize dual measurement points based on voltage swing peak information obtained from peak detector 138 and also based on external voltage swing peak information that can be obtained by controller 140 from external controller 170 that can be generated using peak detector 164 of DSP 160.

Thus, the control loop operations (also referred to interchangeable herein as "AGC loop operations") can be performed by the controller 140 via local loop operations that can be based on (local) voltage swing peak information obtained from the peak detector 138 to provide a first level of AGC control/settings for the VOA 122 and/or PGA 134 and can be performed via global loop operations that enable the DSP 160/ADC 162 to set, on-demand, a desired voltage swing peak value for the output voltage signal (155) that is to be utilized for the local loop operations based on (external) voltage swing peak information obtained by the controller 140 from the DSP 160/ADC 162 (via external controller 170) such that a second level of AGC control/settings can be provided for the VOA 122 and/or PGA 134.

In this manner, embodiments herein allow for primary control of the AGC loop with information from the (local or on-chip) peak detector 138 (compared with rough target voltage swing peak ranges, as discussed in further detail herein) and then sporadic, on-demand recalibration of the on-chip peak detector 138 target (ranges) by the ADC 162 in order to obtain tight accuracy for a desired ADC 162 input signal voltage swing through both local and global loop operations that can be managed/controlled via controller 140 of optical receiver 110. Thus, the on-chip peak detector 138 can facilitate quick control for the TIA 132 output swing.

During operation, the AGC loop performed by the controller 140 may operate through three operational modes, including a calibration mode, an operating or "mission" mode, and a recalibration mode. Broadly, controller 140 can be used to control gains of the optical receiver 110 with no interaction from the external controller 170/DSP 160/ADC 162 at startup, via calibration mode operations and tuning mode operations provided in accordance with embodiments of the present disclosure, while use of the DSP 160/ADC 162 signal information feedback, although slow and asynchronous, can be used via recalibration mode operations provided by controller 140 in accordance with embodiments of the present disclosure in order to help improve accuracy of the ADC 162 input signal swing.

Generally, the calibration mode operations may involve an operational processing loop performed by the controller 140 through which the SNR of the output voltage signal 155 can be optimized by setting the PGA 134 to a minimum coarse gain value (e.g., 0 dB) and a minimum fine gain value (e.g., 0 dB) and first adjusting an attenuation of the VOA 122 before adjusting the coarse and/or fine gain value(s) of the PGA 134 in accordance with operations of a calibration algorithm that can be configured for the controller 140, which is discussed in further detail herein, below. An optimal selection of the coarse gain for the PGA 134 can be determined through the calibration mode operations that may operate according to the calibration algorithm. More detailed operations for the calibration mode and the calibration algorithm are discussed below with reference to FIGS. 4A and 4B.

The calibration mode operations may end upon determining, based on voltage swing peak information obtained from the peak detector 138, that the voltage swing peak value of the output voltage signal 155 satisfies a "narrow" voltage swing peak range, which is also referred to herein as a narrow voltage swing peak window or, more generally, as a narrow window, that can be set by the controller 140 based on a local or initial target voltage swing peak value that can be configured for the controller 140. In at least one embodiment, the controller 140 may determine that voltage swing peak value of the output voltage signal 155 satisfies the narrow window for a threshold number of iterations of the calibration mode operational processing loop (e.g., 4 iterations, etc., which can be configured for the controller 140) before transitioning to the mission mode operations.

Upon determining that the voltage swing peak value of the output voltage signal 155 satisfies or falls within the narrow window, potentially for a threshold number of iterations of the operational processing loop of the calibration mode, the coarse gain value set for the PGA 134 can be "frozen" or maintained at its currently set value, and the controller 140 can perform operations for the mission mode. Freezing the coarse gain of the PGA 134 can help to reduce or eliminate error causing glitches that can occur if the coarse gain is adjusted following calibration of the optical receiver 110.

The operations for the mission mode involve another operational processing loop performed by the controller 140 in which the operational processing loop of the mission mode operates to trigger adjustments for the attenuation of the VOA 122 and/or for the fine gain of the PGA 134 that can be performed in accordance with a tuning algorithm upon either determining that the voltage swing peak value of the output voltage signal 155 (as provided to the controller 140 by the peak detector 138) does not satisfy a given voltage swing peak range, or can perform adjustments of the VOA 122 and/or the PGA 134 upon being triggered by the ADC 162 to adjust the output voltage signal 155 toward an updated target voltage swing peak value.

For some iterations of the operational processing loop performed for the mission mode, the given voltage swing peak range utilized for determining whether to trigger adjustments to the attenuation of the VOA 122 and/or the fine gain of the PGA 134 can involve comparisons between the voltage swing peak value of the output signal 155 (obtained from the peak detector 138) and a "wide" voltage swing peak window or, more generally, a wide window. However, for some iterations of the mission mode operational processing loop, the given voltage swing peak range utilized for determining whether to trigger adjustments to the attenuation of the VOA 122 and/or the fine gain of the PGA 134 can involve comparisons between the voltage swing peak value of the output signal 155 and the narrow window.

With reference briefly to FIG. 2, FIG. 2 is a plot 200 illustrating example details for voltage swing peak windows that may be utilized in conjunction with AGC operations that may performed by the controller 140 through the operational processing loops of the calibration and mission modes, according to an example embodiment. For plot 200, the Y-axis corresponds to voltage, for example, for voltage peak swing values 202 the output voltage signal 150 and the X-axis corresponds to time, for example, representative of successive iterations through the calibration mode or the mission mode operational processing loops by the controller 140 for the input optical signal 150 that can be received by the optical receiver 110. Generally, digital loops can experience limit cycle behavior. Adding hysteresis can reduce limit cycle dithering.

For example, as shown in FIG. 2, consider that an initial target voltage swing peak value 204 is provided for the controller 140. By way of example, consider that the initial target voltage swing peak value is set to 300 millivolts (mV). Based on the initial target voltage swing peak value, the controller 140 can configure a narrow window 210 that includes an upper bound 210a that can be set by adding a narrow window voltage offset value (e.g., 9 millivolts (mV)) to the target voltage swing peak value 204 (e.g., 300 mV+9 mV=309 mV) and a lower bound 210b that can be set by subtracting the narrow window voltage offset value from the target voltage swing peak value 204 (e.g., 300 mV−9 mV=293 mV). Thus, the overall peak voltage swing range for the narrow window 210 in relation to the initial target voltage swing peak value may be characterized as: 300 mV+/−9 mV.

Similarly, the controller 140 use a wide window voltage offset value (e.g., 18 mV) to set an upper bound 220a and a lower bound 220b for a wide window 220 such that the overall peak voltage swing range for the wide window 220 in relation to the initial target voltage swing peak value may be characterized as: 300 mV+/−18 mV.

During the operational processing loop operations of the calibration mode, the controller 140 can compare voltage swing peak values 202 (obtained from the peak detector 138) to the upper and lower bounds of the narrow window 210 for adjustments in attenuation that may be set for the VOA 122 and/or adjustments in gain that may be set for the PGA 134. Upon determining that a corresponding voltage swing peak value 202 satisfies or is within the narrow window 210, as generally shown at 206 (e.g., the voltage swing peak value is greater than the lower bound 210b of the narrow window 210 and less than the upper bound 210a of the narrow window), the controller 140 can transition to the operational processing loop operations of the mission mode that are to utilize the wide window 220 such that the controller can compare voltage swing peak values 202 to the upper and lower bounds of the wide window 220 for adjustments in attenuation that may be set for the VOA 122 and/or adjustments in gain that may be set for the PGA 134.

Although one voltage swing peak value is shown in FIG. 2 as triggering the transition from the calibration mode to the mission mode, in some embodiments, the controller 140 can determine whether a threshold number of consecutive voltage swing peak values are within the narrow window 210 before transitioning to the mission mode.

The transition from the narrow window 210 to the wide window 220 prevents the AGC loop operations performed by the controller 140 from triggering rapid decisions/settings for the VOA 122 and/or PGA 134 based on noise, if the operational loop of the calibration mode settles such that the local peak detector voltage settles at one edge/bound of the narrow window 210.

For example, as shown in FIG. 2 following the narrow to wide transition, subsequent values of the voltage swing peak values may hover near the lower bound 210b of the narrow window 210. However, if something causes the local peak detector voltage to vary considerably, the adjustments by the controller 140 may not be triggered (locally) until a bound of the wide window 220 is exceeded, at which point the controller 140 can switch back to using the narrow window 210 for subsequent adjustments provided during the mission node until the controller 140 determines that the voltage swing peak value of the output signal is back within the range of the narrow window 210, at which time the operations for the mission mode can again be switched back to using the wide window 220 for subsequent checks of the local peak detector voltage.

Thus, the mission mode operations performed by the controller 140 can switch between using a narrow window and a wide window for different operations/adjustments to the attenuation of the VOA 122 and/or the fine gain of the PGA 134 performed during the mission mode.

Returning to FIG. 1, upon being triggered by the DSP 160/ADC 162 (via external controller 170) to perform an adjustment of the target voltage swing peak value of the output voltage signal 155, the controller 140 can enter the recalibration mode in order to adjust the attenuation of the VOA 122 and/or the fine gain of the PGA 134, in according with the tuning algorithm, such that the initial target voltage swing peak value of the output voltage signal 155 can be modified to a new or updated target value.

For example, during the recalibration mode operations, the controller 140 can perform a comparison between an external voltage swing peak value obtained from the DSP 160/external controller to an external voltage swing peak range including an upper and lower bound as set by the DSP 160, also referred to herein as a 'DSP window', in order to determine whether the attenuation of the VOA 122 or the fine gain of the PGA 134 are to be adjusted, in accordance with the tuning algorithm. Following the adjustment in the recalibration mode, the controller 140 can measure or obtain an updated voltage swing peak value of the output signal 155, as provided by the peak detector 138, following a first delay or a second delay (e.g., to allow the output signal to settle following the attenuation/gain adjustment). Subsequent operations performed for the calibration mode or the mission mode by the controller 140 following the operations of the recalibration mode can involve using an updated narrow window and an updated wide window that can be set based on the updated voltage peak swing value obtained during the recalibration mode.

More detailed operations for the mission mode, the recalibration mode, and the tuning algorithm are discussed below with reference to FIGS. 4C, 4D, and 4E.

Advantageously, in accordance with embodiments herein, the controller 140 may utilize a mixed order of operations for the tuning algorithm within the operational processing loop of the mission mode such that gain control can be provided between the various gain stages of the optical receiver 110 in order to optimize the SNR of the output voltage signal 155 for all potential powers of the input optical signal 150 utilizing the VOA 122 at the front end of the optical receiver and the PGA 134 further down the chain. The loop may operate such that if the voltage swing peak value of the output voltage signal 155 increases and exceeds of an upper limit of a target window, the fine gain of PGA 134 is first adjusted before adjustments are provided for the attenuation of the VOA 122; whereas, if the voltage swing peak value decreases and falls below a lower limit of a target window, the attenuation of the VOA 122 if first adjusted before adjustments are provided for the fine gain PGA 134. Such mixed order of operations can help to keep the receiver input signal as large as possible by varying the order of when VOA 122 attenuation is applied/removed or when PGA gain is applied/removed depending on the increasing or decreasing power of the input optical signal, thereby optimizing the SNR of the output voltage signal.

Additionally, iterations for each of the operational processing loop of the calibration mode and the operational processing loop of the mission mode can be performed according to independent loop update times that can be configured for the controller 140, such that following a given iteration of a given operational loop, a subsequent iteration of the operational loop can be delayed in accordance with a first delay time or a second delay time depending on whether the attenuation of the VOA 122 is adjusted or whether the gain of the PGA 134 is for the previous iteration of the loop. Such a delayed loop update time can help to ensure that the signal path blocks and the peak detector 138 have settled before the controller 140 makes a decision regarding another gain change for the output voltage signal during the subsequent iteration of the loop, which can prevent instability in the AGC loop, as well as facilitate dynamic SNR optimizations for the optical receiver 110.

Generally, the VOA 122 and the PGA 134 may have different settling times and attenuation/gain step sizes. For example, changes to the VOA 122 can be impacted by thermal control factors, thus, the VOA 122 typically has a slow settling time; whereas the PGA 134 typically has a fast settling time. The DSP 160/ADC 162 also typically has a slow settling time. Thus, independent loop/gain block update times can be utilized for different programmable gain blocks to fully optimize the AGC loop speed and improve stability/accuracy for operations performed by the controller 140 in order to ensure fast performance and stable loop operation in the wake of widely different time constants by using independent loop update times depending on what block (VOA 122 or PGA 134) is adjusted/updated.

Referring to FIG. 3, FIG. 3 is a flow chart depicting a method 300 associated with operations that may be performed to facilitate AGC for the optical receiver of FIG. 1, according to an example embodiment. In at least one embodiment, operations for method 300 may be performed by controller 140 of optical receiver 110.

As shown at 302, the method may include for a first operational mode (e.g., the calibration mode), first adjusting, by a controller (e.g., controller 140) for a received optical input signal, at least one of: a coarse gain of a PGA, a fine gain of the PGA, or an attenuation of a VOA until a voltage swing peak value of an output signal of the optical receiver satisfies a first voltage swing peak range that is based on a target voltage swing peak value (set for the controller), in which the output signal of the optical receiver is derived from an output of the PGA and the output signal is provided to an external signal processing device (e.g., DSP 160).

In at least one embodiment, the voltage swing peak value of the output signal may be obtained by the controller from a peak detector, such as the peak detector, 138 and measured or compared against the first voltage swing peak range that corresponds to a narrow window in order to determine whether the voltage swing peak value satisfies or is within the narrow window. For the first operational mode, the first adjusting by the controller includes adjusting the attenuation of the VOA 122 before adjusting fine and/or coarse gain of the PGA 134. For example, based on the voltage swing peak value of the output signal being less than a lower bound of the first voltage swing peak range, the first adjusting can include decreasing the attenuation of the VOA to a smallest allowable level before increasing the gain of the PGA. In contrast, based on the voltage swing peak value of the output signal being greater than an upper bound of the first voltage swing peak range, the first adjusting can include increasing the attenuation of the VOA to a highest allowable level before decreasing the gain of the PGA.

As shown at 304, upon the voltage swing peak value of the output signal of the optical receiver satisfying the first voltage swing peak range, the method may include maintaining the coarse gain of the PGA and performing, by the controller, operations for a second operational mode (e.g., the mission mode).

As shown at 304-1, the operations for the second operational mode may include triggering second adjusting of at least one of the attenuation of the VOA or the fine gain of the PGA based on one of: determining that the voltage swing peak value of the output signal does not satisfy a second voltage swing peak range, or determining that an external voltage swing peak value obtained by the controller from an external signal processing device (e.g., from DSP 160 via external controller 170) does not satisfy an external voltage swing peak range that is obtained by the controller from the external signal processing device (e.g., the DSP window). Otherwise, as shown at 304-1, if no second adjusting is triggered for the controller, the operations at 304 can include maintaining the attenuation of the VOA and the fine gain of the PGA at their currently set values/levels.

In at least one embodiment for the first operational mode, the method may include determining, by the controller, that the output signal satisfies the first voltage swing peak range for a threshold number of iterations of a first operational processing loop performed for the first operational mode before performing the operations for the second operational mode.

As noted above, embodiments of the techniques presented herein can be performed according to independent loop update times that can be configured for the controller 140, such that following a given iteration of a given operational loop, a subsequent iteration of the operational loop can be delayed in accordance with a first delay time or a second delay time depending on whether the attenuation of the VOA 122 is adjusted or whether the gain of the PGA 134 is for the previous iteration of the loop. As such, if the coarse gain of the PGA 134 or the fine gain of the PGA 134 is adjusted for an iteration of the first operational processing loop, a subsequent iteration of the first operational processing loop is performed following a first delay; however, if the attenuation of the VOA 122 is adjusted for an iteration of the first operational processing loop, a subsequent iteration of the first operational processing loop is performed following a second delay in which the first delay can be set to be less than the second delay.

Further, the operations of the second operational mode can be performed through a second operational processing loop such that, if the fine gain of the PGA 134 is adjusted for an iteration of the second operational processing loop, a subsequent iteration of the second operational processing loop is performed following a first delay; however, if the attenuation of the VOA 122 is adjusted for an iteration of the second operational processing loop, a subsequent iteration of the second operational processing loop is performed following a second delay in which the first delay can be set to be less than the second delay.

As discussed above with reference to FIG. 2, operations for the mission mode performed by the controller 140 can be performed using wide and narrow windows that can be set based on the target voltage swing peak value. For example, for the method 300 performed by the controller 140 involving the second operational mode utilizing the operations performed through the second operational processing loop, the wide window can be used for an initial iteration of the second operational processing loop (e.g., the second voltage swing peak range is larger than the first voltage swing peak range) for which the second adjusting has been triggered and the narrow window can be used for subsequent iterations of the second operational loop (e.g., the second voltage swing peak range is the same as the first voltage swing peak range) for which the second adjusting has been triggered.

Further for the method 300, although not shown in FIG. 3, based on determining that the external voltage swing peak value obtained from the external signal processing device does not satisfy the external voltage swing peak range (as provided to the controller 140 by the external controller 170, e.g., the DSP window), the method may further include performing, by the controller, operations for a third operational mode (e.g., the recalibration mode) including adjusting at least one of the attenuation of the VOA 122 or the fine gain of the PGA 134 and determining an updated voltage peak swing value of the output signal of the optical receiver following a first delay or a second delay. Subsequent operations performed for the first operational mode or the second operational mode by the controller following the operations of the third operational mode can involve the first voltage swing peak range and the second voltage swing peak range being based on the updated voltage swing peak value.

Consider additional operations for the calibration mode and calibration algorithm that can be performed by the controller 140 in accordance with embodiments herein, as discussed below with reference to FIGS. 4A and 4B. Further consider additional operations for the mission mode, the recalibration mode, and the tuning algorithm that can be performed by the controller in accordance with embodiments herein, as discussed below with reference to FIGS. 4C, 4D, and 4E.

Figure 4A:
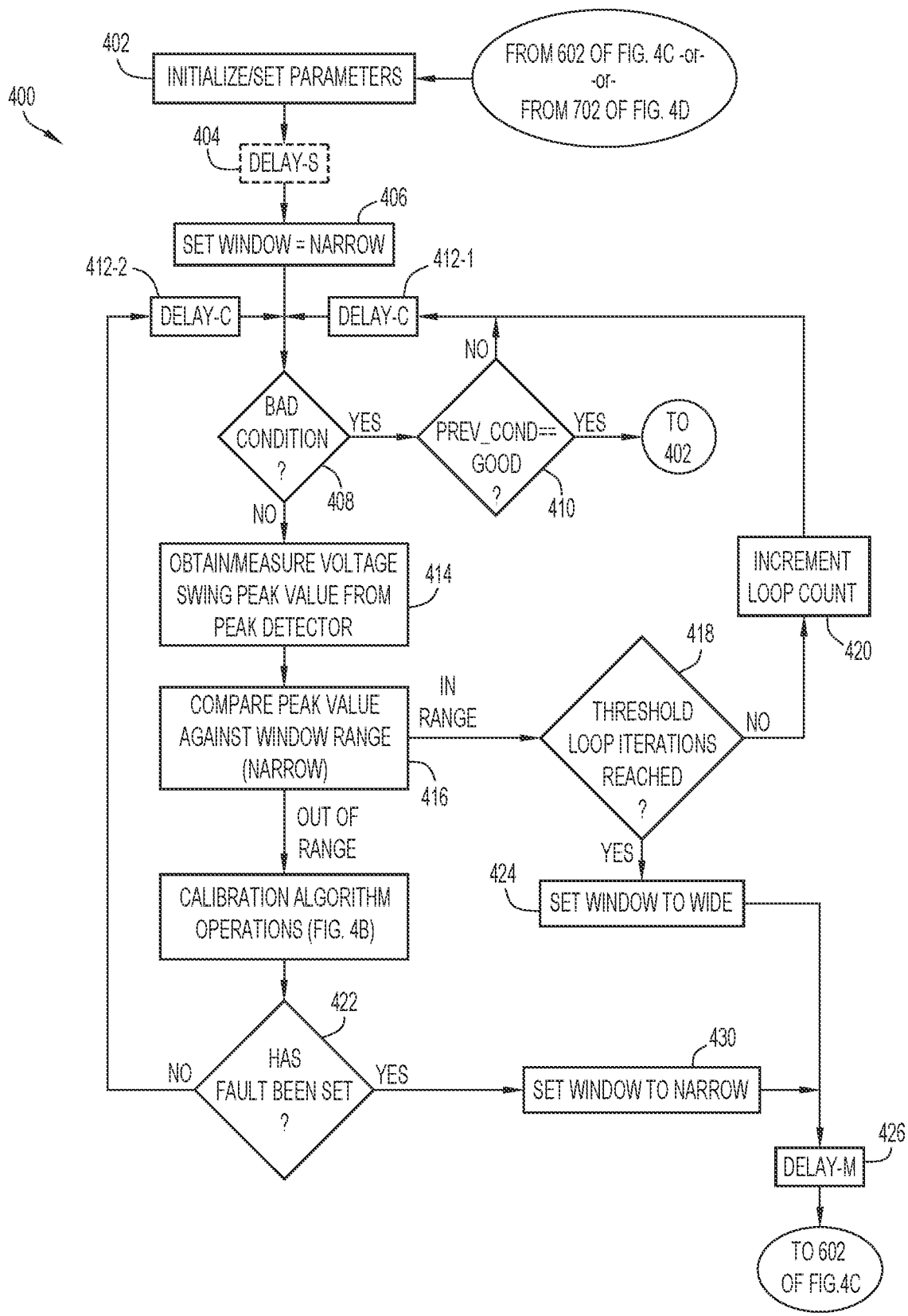
FIG. 4A is a flow chart depicting a method associated with calibration mode operations that may be performed to facilitate AGC for the optical receiver of FIG. 1 during a calibration mode, according to an example embodiment.

Referring to FIG. 4A, FIG. 4A is a flow chart depicting a method 400 associated with calibration mode operations that may be performed by the controller 140 to facilitate AGC for the optical receiver 110 during the calibration mode, according to an example embodiment. FIG. 4B is discussed with reference to FIG. 4B and is a flow chart depicting a method 500 associated with calibration algorithm operations that may be performed by the controller 140 for a calibration algorithm can be utilized in conjunction with the calibration mode operations of FIG. 4A, according to an example embodiment.

As shown at 402, the calibration mode operations may include initialization operations being performed by the controller 140 for initializing or setting parameters that are to be utilized through different AGC loop operations performed by the controller 140 through the calibration mode operations, the mission mode operations, and/or the recalibration mode operations. In at least one embodiment, the parameters can be configured and stored in memory of the controller 140. In at least one embodiment, the parameters may be reconfigured at any time (e.g., by an operator, etc.) and stored in the memory of the controller.

In at least one embodiment, the parameters may include an attenuation range defining a minimum and a maximum amount attenuation that can be set for the VOA 122 (e.g., 0 dB to 12 dB, or the like) and an attenuation step size (e.g., 1 dB) that can be used for adjusting the attenuation of the VOA 122 during operation of the optical receiver 110. For the calibration mode operations, the attenuation for the VOA 122 can be set to the maximum amount through the initialization operations performed at 402, such that the calibration mode operations may begin with the maximum attenuation for the VOA 122 being set for evaluations of the voltage swing peak value of the output signal 155 as provided by peak detector 138.

In at least one embodiment, the parameters may include a fine gain range defining a minimum and a maximum amount of fine gain that can be set for the PGA 134 (e.g., 0 dB to 10 dB) and a fine gain step size (e.g., 0.5 dB) that can be used for adjusting the fine gain of the PGA 134 during operation of the optical receiver 110. In at least one embodiment, the parameters may include a coarse gain range defining a minimum and a maximum amount of coarse gain that can be set for the PGA 134 (e.g., 0 dB to 20 dB) and a coarse gain step size (e.g., 5 dB) that can be used for adjusting the coarse gain of the PGA 134 during operation of the optical receiver.

In at least one embodiment, the parameters may further include a target voltage swing peak value that can be configured for use through different operations by the controller 140, until an updated target voltage swing peak value may be determined by the controller. (e.g., through recalibration mode operations that can be triggered by the DSP 160 via external controller 170). In at least one embodiment, the parameters may further include a narrow window voltage offset value that can be used in combination with the target voltage swing peak value to set the upper and lower bounds that define the voltage swing peak range for the narrow window that can be utilized through different operations performed by the controller 140. In at least one embodiment, the parameters may further include a wide window voltage offset value that can be used in combination with the target voltage swing peak value to set the upper and lower bounds that define the voltage swing peak range for the wide window that can be utilized through different operations performed by the controller 140.

Additionally, in at least one embodiment, the parameters may include various delay values that can be utilized for different operations performed by the controller 140 during operation of the optical receiver 110, including, but not limited to, calibration mode delay (DELAY-C) values, mission mode delay (DELAY-M) values, and recalibration mode delay (DELAY-R) values. In some embodiments, an additional startup delay value (DELAY-S) can be configured for the controller 140 in which the startup delay value represents an amount of time (e.g., 500 milliseconds (mS)) that the controller is to wait, following the initialization operations at 402, before starting operations for calibrating the VOA 122 and/or PGA 134.

In at least one embodiment, the DELAY-C values may include a first delay value (e.g., 18 mS) that is to be used by the controller 140 for a subsequent iteration of the operational processing loop for the calibration mode following an adjustment of the fine/coarse gain of the PGA 134 or if no adjustment is made to the PGA 134 or the VOA 122 and a second delay value (e.g., 36 mS) that is to be used by the controller 140 for a subsequent iteration of the operational processing loop for the calibration mode following an adjustment of the attenuation of the VOA 122.

In at least one embodiment, the DELAY-M values may include a first delay value (e.g., 18 mS) that is to be used by the controller 140 for a subsequent iteration of the operational processing loop for the mission mode following an adjustment of the fine/coarse gain of the PGA 134 or if no adjustment is made to the PGA 134 or the VOA 122 and a second delay value (e.g., 36 mS) that is to be used by the controller 140 for a subsequent iteration of the operational processing loop for the mission mode following an adjustment of the attenuation of the VOA 122.

In at least one embodiment, the DELAY-R values may include a first delay value (e.g., 18 mS) that is to be used by the controller 140 upon performing an adjustment of the fine/coarse gain of the PGA 134 before the controller 140 obtains/measures a voltage swing peak value from the peak detector 138 for determining an updated voltage swing peak value for use in setting the narrow and wide windows/subsequent evaluations of the voltages obtained from the peak detector 138. In at least one embodiment, the DELAY-R values may include a second delay value (e.g., 36 mS) that is to be used by the controller 140 upon performing an adjustment of the attenuation of the VOA 122 before the controller 140 obtains/measures a voltage swing peak value from the peak detector 138 for determining an updated voltage swing peak value for use in setting the narrow and wide windows/subsequent evaluations of the voltages obtained from the peak detector 138.

In at least one embodiment, the initialization operations performed by the controller 140 at 402 may include setting an operating condition parameter for the optical receiver to indicate that the optical receiver is in a good operating state (e.g., condition="GOOD"). The operating condition parameter may be updated/set to indicate a bad operating state (e.g., condition="BAD") throughout operation of the optical receiver 110 upon determining that various conditions have been triggered, such as, for example, determining that a receive loss of signal (RX LoS) is triggered (e.g., the input signal received by the optical receiver 110 drops or is interrupted, that an input for the optical receiver is overloaded, that the DSP 160 has indicated that it has entered a recalibration state, or the like).

In at least one embodiment, the initialization operations performed by the controller 140 at 402 may include initializing a loop counter value for the calibration mode operations to zero (0) and setting a threshold loop value (e.g., 3, for four time through the loop) that can be used during the calibration mode operations to determine whether a threshold number of iterations of the operational processing loop have been performed or, stated differently, to determine/confirm whether the voltage swing peak value of the output signal 155 of the optical receiver 110 has settled within the narrow window before completing the calibration mode operations and transitioning to the mission mode operations.

In at least one embodiment, the initialization operations may further include setting a low DSP threshold value for any external voltage swing peak values that may be received by the controller 140 from the DSP 160/external controller 170. Generally, output control/signal peak information generated by a DSP may be provided at a lower rate than the rate at which the local AGC loop operations are performed by the controller 140 for the optical receiver 110. In some instances, it can take several seconds for the DSP 160 to generate actual peak signal information that can be consumed/used by the controller 140. During this time, however, the DSP 160 may output signal information that is erroneous/low. As such, a low DSP threshold value can be set for the controller 140 in order to filter out such unusable signal peak information that may be received from the DSP 160/external controller 170.

Figure 4B:
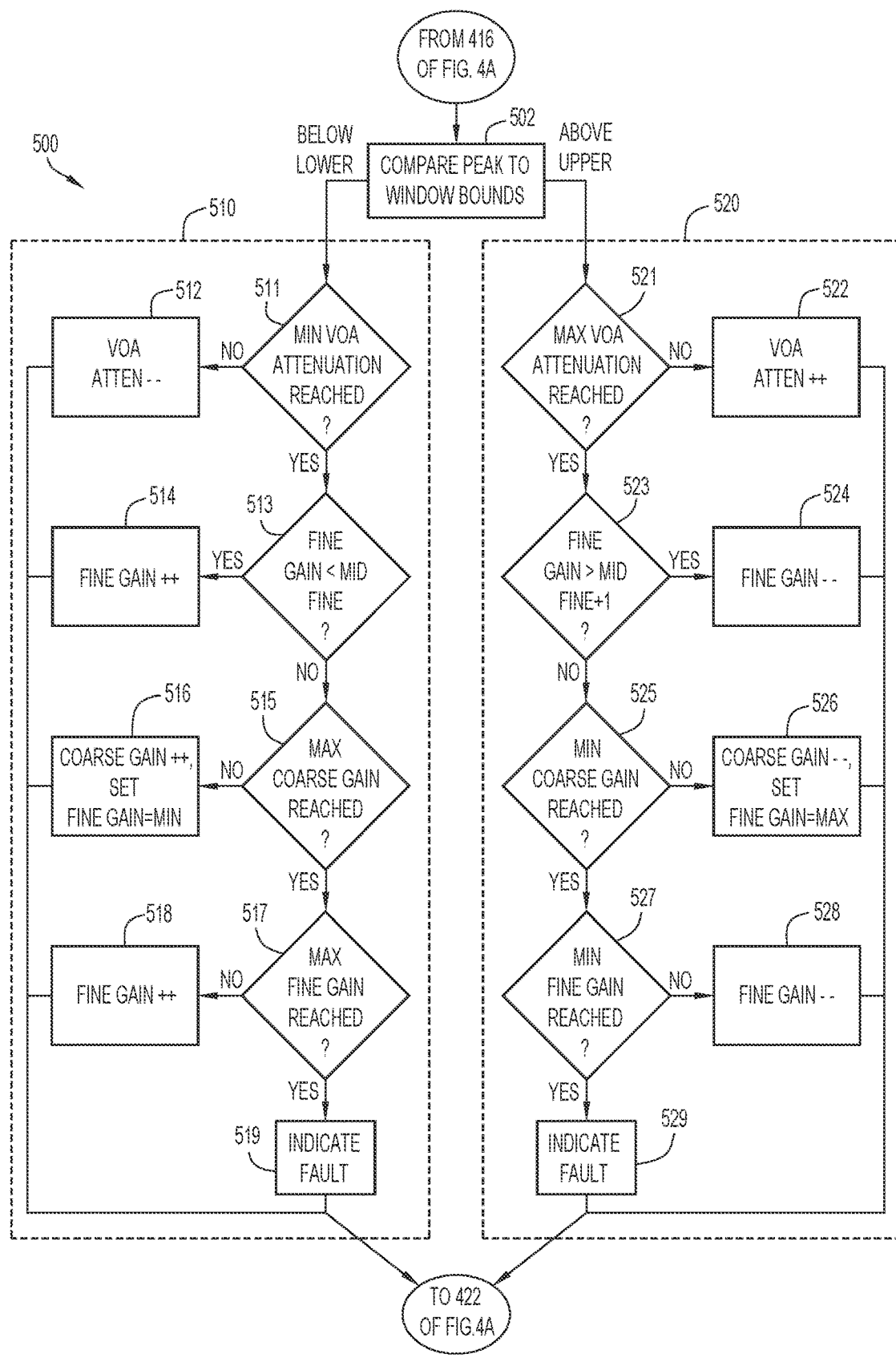
FIG. 4B is a flow chart depicting a method associated with operations that may be performed for a calibration algorithm can be utilized in conjunction with the calibration mode operations of FIG. 4A, according to an example embodiment.
Figure 4C:
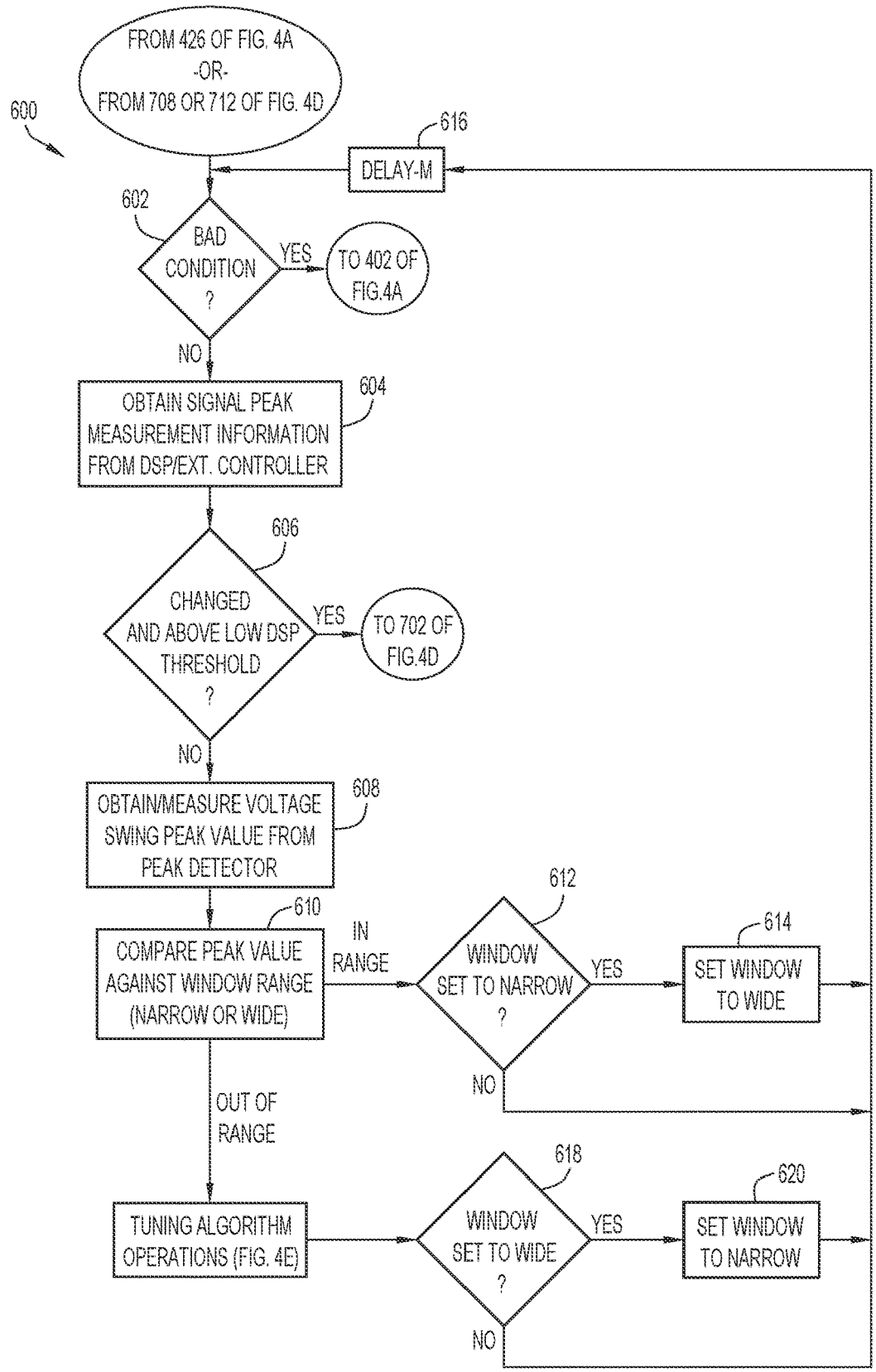
FIG. 4C is a flow chart depicting a method associated with mission mode operations that may be performed to facilitate AGC for the optical receiver of FIG. 1 during a mission mode, according to an example embodiment.
Figure 4D:
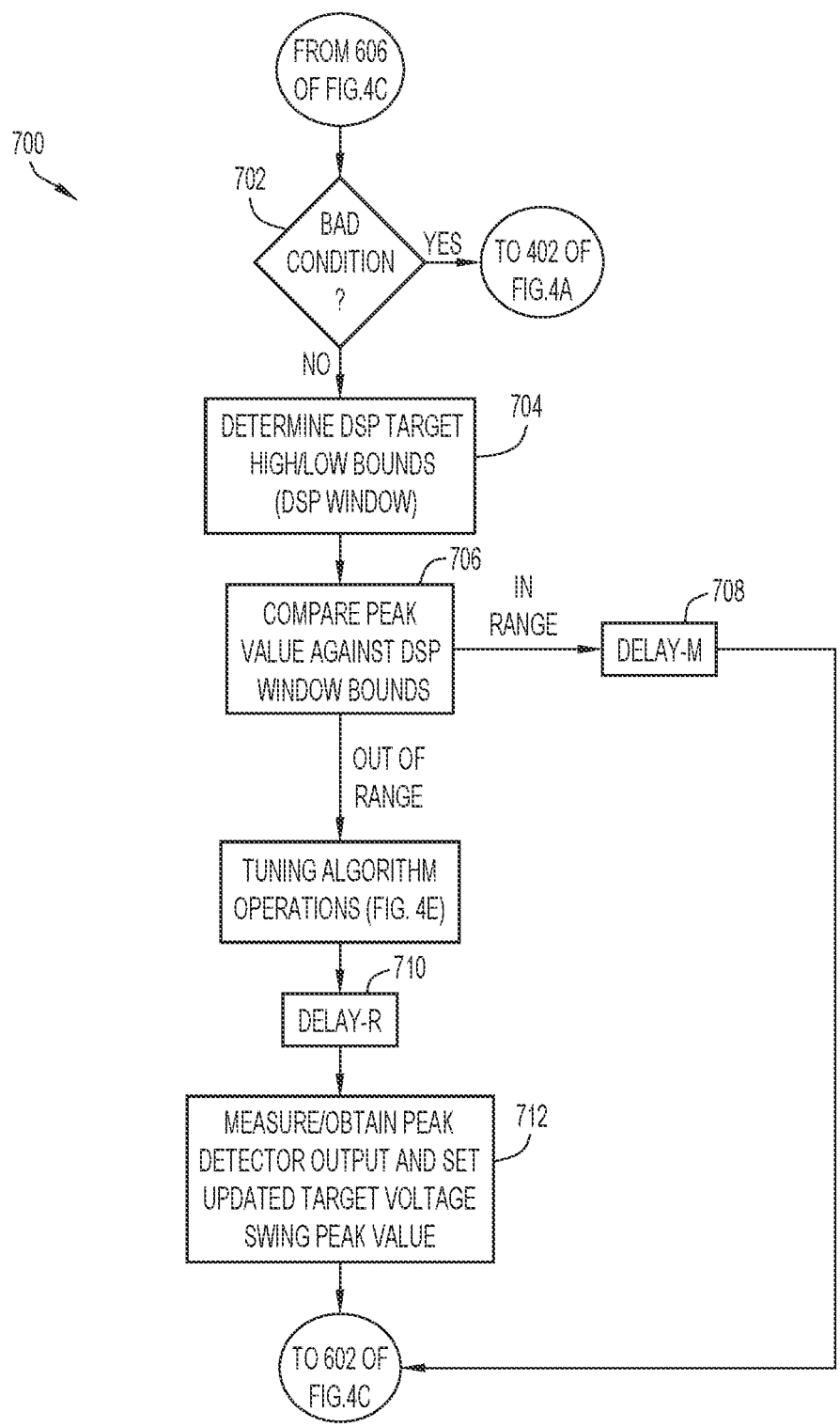
FIG. 4D is a flow chart depicting a method associated with operations that may be performed to facilitate AGC for the optical receiver of FIG. 1 during a recalibration mode, according to an example embodiment.

As discussed in further detail herein with reference to FIGS. 4C and 4D, in some instances, the initialization operations at 402 can be triggered through other operations performed by the controller 140.

Following the initialization operations at 402, the controller 140 can set the voltage swing peak window that is to be utilized at the start of the calibration mode to correspond to the narrow window, as shown at 406. In some embodiments, the operations at 406 may be performed following the DELAY-S time, as shown at 404.

Continuing to 408, the calibration mode operations can include determining whether the operating condition for the optical receiver 110 is in a bad operating state. Upon determining that the operating condition is in a bad operating state (YES at 408), the operations can continue to 410 to determine whether a previous operating condition for the optical receiver 110 indicated a good operating state. If the previous operating condition for the optical receiver 110 indicated a good operating state, the operations can return to 402 in order to again perform the initialization operations. Otherwise, if the previous operating condition for the optical receiver 110 did not indicate a good operating state, the operations at 410 can continue to 412-1 at which further operations can be delayed according the first delay value of DELAY-C (e.g., no adjustments were performed, so a delay of 18 mS can be used) and the operating condition state can be checked again at 408.

Assuming a determination is made at 408 that the operating condition for the optical receiver 110 does not indicate a bad operating state (NO at 408), the operations can continue to 414 at which the controller 140 obtains or measures a voltage swing peak value provided by the peak detector 138 and the operations continue to 416. At 416, the controller 140 compares the voltage swing peak value against a corresponding voltage peak swing range of the narrow window (recall, the operations at 406 set the voltage peak swing window to be the narrow window for the calibration mode operations) in order to determine whether the peak value is within the range of the narrow window or is out of the range of the narrow window.

Upon determining that the obtained voltage peak swing value is within the range of the narrow window (IN RANGE), the operations can continue to 418 to determine whether the threshold number of loop iterations is reached for the operational processing loop of the calibration mode, as shown at 418. If the threshold number of loop iterations is not reached (NO), the operations continue to 420 at which the loop count is incremented and the operations continue to 412-1 at which further operations can be delayed according the first delay value of DELAY-C (e.g., no adjustments were performed, so a delay of 18 mS can be used) and the operating condition state can be checked again at 408 and subsequent operations can again be performed for the calibration mode operational processing loop.

However, returning to 416, upon determining that the obtained voltage peak swing value is out of the range of the narrow window (OUT OF RANGE), the method can continue to perform calibration algorithm operations, as shown in FIG. 4B, as discussed below.

Turning to FIG. 4B involving method 500 associated with calibration algorithm operations that can be performed by controller 140, as shown at 502, the calibration algorithm operations can include comparing the obtained voltage swing peak value (used at 416) to the upper and lower bounds of the narrow window. AGC operations performed by the controller 140 for the calibration algorithm can vary depending on whether the obtained voltage swing peak value is below the lower bound of the window, which triggers AGC operations 510 that provide for increasing the voltage swing of the output signal 155 to be within the narrow window range or whether the obtained voltage swing peak value is above the upper bound of the window, which triggers AGC operations 520 that provide for decreasing the voltage swing of the output signal 155 to be within the narrow window range.

Consider, for example, AGC operations 510 that can be performed by the controller 140 if it is determined that the obtained voltage peak swing value is below the lower bound of the narrow window. At 511, it can be determined whether a minimum allowable attenuation is reached for the VOA 122. Recall, at initialization during the calibration mode operations, the attenuation of the VOA 122 can be set to its maximum allowable level of attenuation.

If it is determined that the minimum allowable attenuation for the VOA 122 is not reached (NO at 511), then the attenuation of the VOA 122 can be decreased by one attenuation step according to the configured attenuation step size (e.g., 1 dB), as shown at 512, and the operations can return to 422 of FIG. 4A and can continue for the operational processing loop of the calibration mode.

For example, returning briefly to FIG. 4A, at 422, the controller 140 can determine whether any faults may have been set during the calibration algorithm operations and if not (NO at 422) the operations can continue to 412-2 at which further operations can be delayed according to a given delay value of DELAY-C, which can be the first delay value if the PGA 134 gain was adjusted during the calibration algorithm operations or no adjustments were made or can be the second delay value if the VOA 122 attenuation was adjusted during the calibration algorithm operations and the operating condition state can be checked again at 408 and subsequent operations can again be performed for the calibration operational processing loop, as discussed herein.

Returning to FIG. 4B at 511, if it is determined that the minimum VOA 122 attenuation is reached (YES at 511), the operations can continue to 513, at which it can be determined whether the fine gain of the PGA 134 is less than a fine gain midpoint value. For example, if the maximum allowable fine gain that can be set for the PGA 134 is 10 dB, then then fine gain midpoint value would be 5 dB such that, at 513, the controller 140 can determine whether a current fine gain setting for the PGA 134 is less than 5 dB. If so (YES at 513), then the fine gain of the PGA 134 can be increased by one fine gain step size (e.g., 0.5 dB), as shown at 514, and the operations can return to 422 of FIG. 4A and can continue for the operational processing loop of the calibration mode, as discussed above.

However, if it is determined at 513 that the fine gain of the PGA 134 is set to a value such that the fine gain of the PGA 134 is not less than the fine gain midpoint value (NO at 513), the operations can continue to 515 at which it can be determined whether the maximum coarse gain for the PGA 134 is set. If not (NO at 515), then the coarse gain of the PGA 134 can be increased by one coarse gain step size (e.g., 5 dB) and the fine gain of the PGA 134 can be set to the minimum fine gain value for the PGA 134, as shown at 516, and the operations can return to 422 of FIG. 4A and can continue for the operational processing loop of the calibration mode, as discussed above.

Thus, the AGC operations 510 can provide for utilizing up to 5 dB of fine gain for the PGA 134 until the coarse gain is utilized. If the coarse gain of the PGA 134 is used, the fine gain can be backed off for another iteration of the operational processing loop of the calibration mode, at which point the fine gain may then again be increased, if used.

Returning to 515, if it is determined that the maximum coarse gain for the PGA 134 is set (YES at 515), the operations can continue to 517 at which it can be determined if the fine gain of the PGA 134 is set to the maximum allowable value (e.g., 10 dB). If not (NO at 517), the fine gain of the PGA 134 can be increased by one fine gain step size (e.g., 0.5 dB), as shown at 518, and the operations can return to 422 of FIG. 4A and can continue for the operational processing loop of the calibration mode, as discussed above.

Returning to 517, if all of the fine gain of the PGA 134 has been used such that the maximum fine gain has been reached for the PGA 134 (YES at 517), then the operations can proceed to 519 at which a fault state can be set to TRUE for the controller 140 and the operations can return to 422 of FIG. 4A. Setting the fault state to TRUE may not interrupt or stop the calibration mode operations, or additional operations of the controller 140, but rather may be used for other purposes, such as debugging, etc. For example, for instances in which a fault state may be set, the determination at 422 can be triggered such that the operations can continue to 430 at which the controller 140 can set the voltage peak swing window to be the narrow window, and further operations can be delayed according to the appropriate first or second value of DELAY-M, as shown at 426, before proceeding to operations 602 of FIG. 4C for the mission mode operations.

Returning to 502, consider AGC operations 520 that can be performed upon determining at 502 that the obtained voltage swing peak value (obtained from peak detector 138) is above the upper bound of the narrow window such that AGC operations 520 can be utilized to provide for decreasing the voltage swing of the output signal 155 to be within the narrow window range.

At 521, it can be determined whether a maximum allowable attenuation is reached for the VOA 122. If it is determined that the maximum attenuation for the VOA 122 is not reached (NO at 521), then the attenuation of the VOA 122 can be increased by one attenuation step according to the configured attenuation step size (e.g., 1 dB), as shown at 522, and the operations can return to 422 of FIG. 4A and can continue for the operational processing loop of the calibration mode.

However, if it is determined at 521 that the maximum allowable attenuation is reached for the VOA 122 (YES at 521), the operations can continue to 523, at which it can be determined whether the fine gain of the PGA 134 is greater than a fine gain midpoint value plus one step (e.g., 5.5 dB). If so (YES at 523), then the fine gain of the PGA 134 can be decreased by one fine gain step size, as shown at 524, and the operations can return to 422 of FIG. 4A and can continue for the operational processing loop of the calibration mode, as discussed above.

However, if it is determined at 523 that the fine gain of the PGA 134 is set to a value such that the fine gain of the PGA is not greater than the fine gain midpoint value plus one step (NO at 523), the operations can continue to 525 at which it can be determined whether the minimum coarse gain (e.g., 0 dB) for the PGA 134 has been reached. If not (NO at 525), the coarse gain of the PGA 134 can be decreased by one step size and the fine gain of the PGA 134 can be set to the maximum fine gain value (e.g., 10 dB), as shown at 526, and the operations can return to 422 of FIG. 4A and can continue for the operational processing loop of the calibration mode, as discussed above.

Thus, converse to the AGC operations 510 for increasing the output signal peak swing voltage, the AGC operations 520 can provide for decreasing the output signal peak swing voltage by adding attenuation to the input signal via the VOA 122 and/or removing gain by first removing up to 5 dB of fine gain before removing 5 dB of coarse gain.

Returning to 525, if it is determined that the minimum coarse gain for the PGA 134 is reached (YES at 525), the operations can continue to 527 at which it can be determined if the minimum fine gain for the PGA 134 has been reached. If not (NO at 527), the operations can continue to 528 to decrease the fine gain for the PGA 134 by one fine gain step size, as shown at 528, and the operations can return to 422 of FIG. 4A and can continue for the operational processing loop of the calibration mode, as discussed above.

Returning to 527, if all of the fine gain of the PGA 134 has been removed such that the minimum fine gain of the PGA 134 has been reached (YES at 527), then the operations can proceed to 529 at which a fault state can be set to TRUE for the controller 140 and the operations can return to 422 of FIG. 4A and can continue for the operational processing loop of the calibration mode, as discussed above.

Broadly, the order of AGC operations as provided via the calibration algorithm provided in accordance with embodiments herein maximizes the SNR of the output signal 155 at calibration over all potential input powers of a received input optical signal 150.

Returning to 416 and 418 of FIG. 4A, consider that one or more iterations of the operational processing loop for the calibration mode result in calibration algorithm operations that adjust and maintain the voltage swing peak value of the output signal 155 to be within the narrow window for the threshold number of loop iterations such that the controller 140 determines at 418 that the threshold number of loop iterations is reached (YES at 418) in which the operations can continue to 424 at which the controller 140 can transition the voltage peak swing window to be utilized for further operations (of the mission mode, discussed below) to correspond to the wide window. Thereafter, the operations may continue to 426, at which further operations can be delayed according to a given delay value of DELAY-M, which can be the first delay value if the PGA 134 was adjusted during the calibration algorithm operations, or if no adjustments were made, or can be the second delay value if the VOA 122 attenuation was adjusted during the calibration algorithm operations.

Following the delay at 426, the operations can continue to 602 of FIG. 4C, which is a flow chart depicting a method 600 associated with mission mode operations that may be performed by the controller 140 to facilitate AGC for the optical receiver 110 during the mission mode, according to an example embodiment. FIGS. 4D and 4E are discussed with reference to FIG. 4C in which FIG. 4D is a flow chart depicting a method 600 associated with recalibration mode operations that may be performed by the controller 140 to facilitate AGC for the optical receiver 110 during the recalibration mode and FIG. 4E is a flow chart depicting a method 700 associated with tuning algorithm operations that may be performed by the controller 140 for a tuning algorithm can be utilized in conjunction with the mission mode operations of FIG. 4C and the recalibration mode operations of FIG. 4D, according to various example embodiments Turning to FIG. 4C, the mission mode operations may involve another operational processing loop that may begin at 602 at which the controller 140 can determine whether the operating condition for the optical receiver 110 is in a bad operating state (similar to the operations as discussed for 408 of FIG. 4A). If it is determined at 602 that the operating condition for the optical receiver 110 is in a bad operating state (YES at 602), the operations can return to 402 of FIG. 4A and resume as described above. However, if it is determined at 602 that the operating condition for the optical receiver 110 not in a bad operating state (NO at 602), the operations can continue to 604.

At 604, the operations can include obtaining voltage swing signal peak measurement information from the DSP 160, via external controller 170. In at least one embodiment, the information obtained from the DSP 160, via the external controller 170, can include an (external) voltage swing peak value (as provided via peak detector 164) and high and low target voltage swing peak values characterizing a voltage swing peak range desired by the DSP 160, referred to herein as the external voltage swing peak range or, more generally, the DSP window.

Continuing to 606, the operations can include the controller 140 performing a check to determine whether the external voltage swing peak value obtained via the external controller 170 has changed (e.g., from a previous iteration of the loop) and whether the value obtained, if it has changed, is above the low DSP threshold value (e.g., as set via operations 402, discussed above for FIG. 4A). If either of the conditions is not valid, such that the value obtained has not changed (from a previous iteration of the loop) or the value obtained has changed but is not above the low DSP threshold (NO at 606), the operations can continue to 608. However, if the value obtained has changed (from a previous iteration of the loop) and the value obtained is above the low DSP threshold (YES at 606), the operations can continue to 702 of FIG. 4D in order to perform various recalibration operations, which are discussed in further detail herein, below.

However, returning to 606, consider a scenario in which the operations continue to 608 (following the calibration mode operations) at which the controller 140 obtains or measures a voltage swing peak value provided by the peak detector 138 and the operations continue to 610. At 610, the controller 140 compares the voltage swing peak value against a corresponding voltage peak swing range of a particular wide or narrow window to determine whether the value is in the range of the window or is outside the range of the window.

Recall, the operations at 424 for the non-fault scenario of the calibration mode operations set the voltage peak swing window to be the wide window upon the range being satisfied for the narrow window, for subsequent use in the mission mode operations. Thus, for a first iteration of the operational processing loop of the mission mode operations, the operations at 610 can include comparing the voltage swing peak value against a corresponding voltage peak swing range for the wide window.

Upon determining at 610 that the voltage swing peak value is within the given window range (the wide window range, in this example iteration of the loop) (IN RANGE), the operations can continue to 612 at which the controller 140 determines whether the current voltage peak swing range is set to the narrow window. If not (NO at 612, so the window is set to the wide window range), the operations can continue to 616 at which further operations can be delayed according the first delay value of DELAY-M (e.g., no adjustments were performed for the iteration of the loop, so a delay of 18 mS can be used) and the operating condition state can be checked again at 602 and subsequent operations can again be performed for the mission mode operational processing loop.

However, if it is determined at 612 the current voltage peak swing range is set to the narrow window (YES at 612), the operations can continue to 614 at which the range can be set to the wide window and the operations can continue to 616 at which further operations can be delayed according an appropriate delay value of DELAY-M (e.g., depending on whether any adjustments were made) and the operating condition state can be checked again at 602 and subsequent operations can again be performed for the mission mode operational processing loop.

Figure 4E:
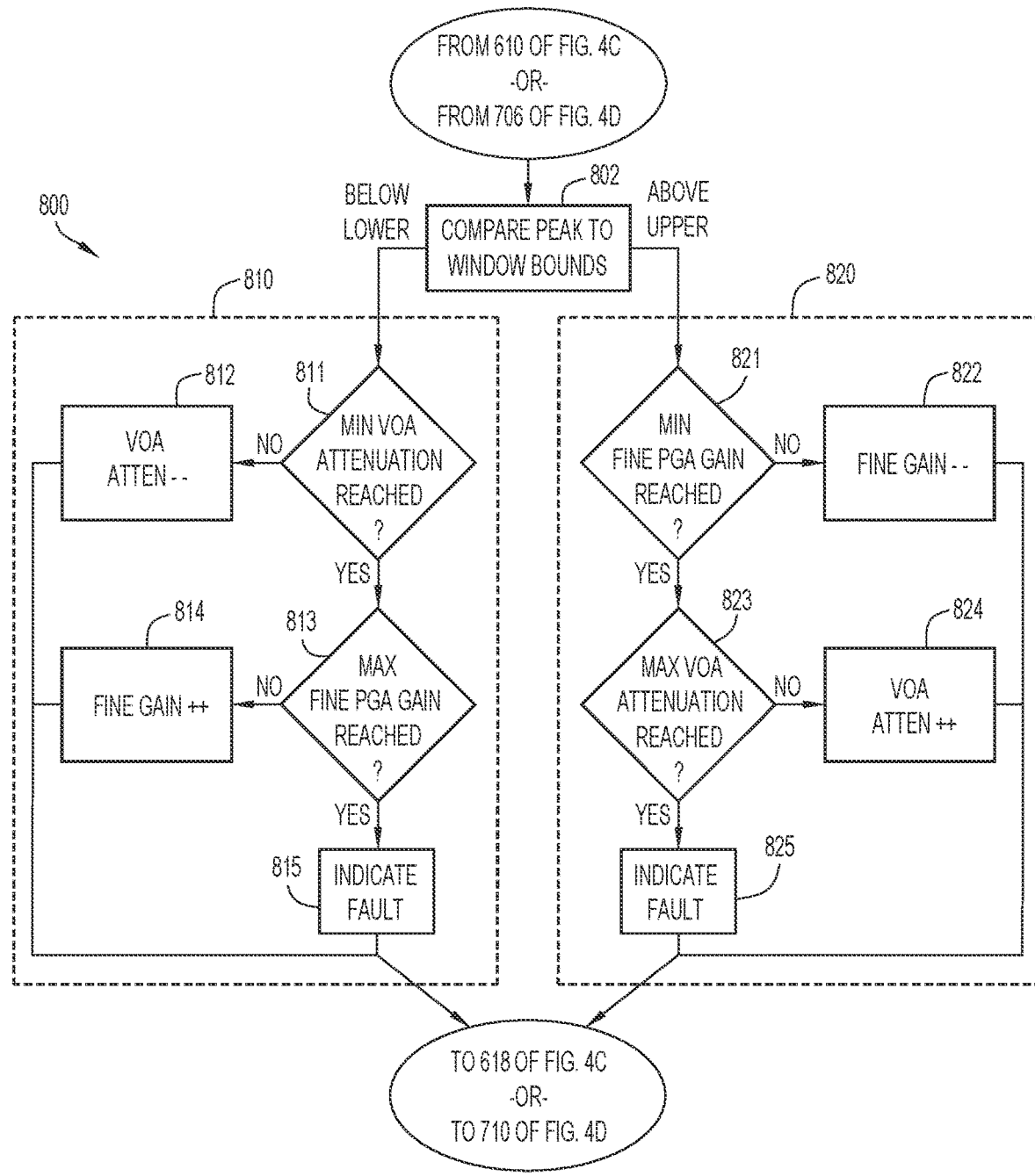
FIG. 4E is a flow chart depicting a method associated with operations that may be performed for a tuning algorithm that can be utilized during the mission mode operations of FIG. 4C or the recalibration mode operations of FIG. 4D, according to an example embodiment.

Returning to 610, consider for the example iteration of the loop that the controller determines that the voltage peak swing value obtained from the peak detector 138 is outside the range of the given window (OUT OF RANGE), the wide window range in this example iteration, such that the method can continue to perform tuning algorithm operations, as shown in FIG. 4E, discussed below.

Turning to FIG. 4E involving method 800 associated with tuning algorithm operations that can be performed by the controller, as shown at 802, the tuning algorithm operations can include comparing the obtained voltage swing peak value (used at 610 in this example iteration) to the upper and lower bounds of a given window in which the given window used for the comparison at 802 can be determined based on the mode of operations from which the tuning algorithm was triggered, such as the mission mode or the recalibration mode. In this example iteration, the wide window upper and lower bounds can be used for the comparison at 802.

AGC operations performed by the controller 140 for the tuning algorithm can vary depending on whether the obtained voltage swing peak value is below the lower bound of the given window, which triggers AGC operations 810 that provide for increasing the voltage swing of the output signal 155 to be within the given window range or whether the obtained voltage swing peak value is above the upper bound of the given window, which triggers AGC operations 820 that provide for decreasing the voltage swing of the output signal 155 to be within the given window range.

As discussed above, the coarse gain of the PGA 134 is frozen following the calibration mode operations and the tuning algorithm provides a mixed order of applying VOA attenuation or applying PGA gain operations depending on whether AGC operations 810 are used to increase the voltage swing peak of the output signal to be within a given window range or whether AGC operations 820 are used to decrease the voltage swing peak of the output signal to be within a given window range.

Consider, for example, AGC operations 810 that can be performed by the controller 140 if it is determined that the obtained voltage peak swing value is below the lower bound of a given window such that, as shown at 811, it can be determined whether a minimum allowable attenuation is reached for the VOA 122. If it is determined that the minimum allowable attenuation for the VOA 122 is not reached (NO at 811), then the attenuation of the VOA 122 can be decreased by one attenuation step according to the configured attenuation step size (e.g., 1 dB), as shown at 812, and the operations can return to 618 of FIG. 4C and can continue for the operational processing loop of the mission mode, in this example iteration of the loop.

For example, returning briefly to FIG. 4C, at 618, the controller can determine whether the current voltage peak swing range is set to the wide window. If not (NO at 612, so the window is set to the narrow window range), the operations can continue to 616 at which further operations can be delayed according the appropriate delay value of DELAY-M (e.g., depending on whether attenuation or gain was applied) and the operating condition state can be checked again at 602 and subsequent operations can again be performed for the mission mode operational processing loop.

Recall, as discussed for FIG. 2, above that the controller 140 can transition between usage of the wide and narrow windows throughout various mission mode operations. For example, following operations of tuning algorithm in which an adjustment to the VOA 122 or to the PGA 134 is made, window can be set to the narrow range until it is determined, for a subsequent iteration of the loop, that the voltage peak swing value of the output signal 155 is back within the range of the narrow window, and then the window can be switched back to the wide window (e.g., at 614) for subsequent iterations of the mission mode operational processing loop, until another adjustment may be triggered by the controller or may be triggered by the DSP 160. Thus, upon determining at 618 that the current voltage peak swing range is set to the wide window (YES at 612) following an adjustment via the tuning algorithm operations, the range can be set back to the narrow window, as shown at 620 and the operations can continue to 616 at which further operations can be delayed according the appropriate delay value of DELAY-M (e.g., depending on whether attenuation or gain was applied) and the operating condition state can be checked again at 602 and subsequent operations can again be performed for the mission mode operational processing loop.

Returning to the AGC operations at 810 of FIG. 4E, consider that the controller determines, at 811, that the minimum allowable attenuation is reached for the VOA (YES at 811), such that the operations can continue to 813 at which it can be determined whether a maximum amount of fine gain of the PGA 134 is currently being used. If not (NO at 813), the operations can continue to 814 at which the fine gain can be increased according to the fine gain step size and the operations can return to 618 of FIG. 4C and can continue for the operational processing loop of the mission mode, in this example iteration of the loop. However, if the maximum amount of fine gain is reached for the PGA 134 (YES at 815), the operations can continue to 815 at which a fault can be indicated and the operations can return to 618 of FIG. 4C and can continue for the operational processing loop of the mission mode, in this example iteration of the loop.

Returning to 802, consider AGC operations 820 that can be performed upon determining at 802 that the obtained voltage swing peak value (obtained from peak detector 138) is above the upper bound of the given window such that AGC operations 520 can be utilized to provide for decreasing the voltage swing of the output signal 155 to be within the given window range, for example, the wide window range. As shown in FIG. 4E, AGC operations 820 start with potential adjustments to the fine gain of the PGA 134 at 821 and 822 as opposed to the attenuation of the VOA 122, as used in the AGC operations 810.

At 821, it can be determined whether the minimum allowable fine gain for the PGA 134 is reached. If not (NO at 821), the operations can continue to 822 at which the fine gain can be decreased by one fine gain step size and the operations can return to 618 of FIG. 4C and can continue for the operational processing loop of the mission mode, in this example iteration of the loop. However, if it is determined at 821 that the minimum allowable fine gain for the PGA 134 is reached (YES at 821), the operations can continue to 823 at which it can be determined whether a maximum allowable attenuation is reached for the VOA 122.

At 823, if it is determined that the maximum attenuation for the VOA 122 is not reached (NO at 823), the operations can continue to 824 at which the attenuation of the VOA 122 can be increased by one attenuation step size and the operations can return to 618 of FIG. 4C and can continue for the operational processing loop of the mission mode, in this example iteration of the loop. However, if the maximum amount of attenuation is reached for the VOA 122 (YES at 815), the operations can continue to 825 at which a fault can be indicated and the operations can return to 618 of FIG. 4C and can continue for the operational processing loop of the mission mode, in this example iteration of the loop.

Returning to 606 of FIG. 4D, consider an example scenario in which recalibration mode operations are triggered for the controller 140 (e.g., the external voltage swing peak value obtained from the DSP 160/external controller 170 is changed and is above the low DSP threshold value), such that the controller 140 transition to 702 for method 700 associated with the recalibration mode operations.

As shown at 702, the controller 140 can determine whether the operating condition for the optical receiver 110 is in a bad operating state (similar to the operations as discussed for 408 of FIG. 4A). If it is determined at 702 that the operating condition for the optical receiver 110 is in a bad operating state (YES at 702), the operations can return to 402 of FIG. 4A and resume as described above. However, if it is determined at 702 that the operating condition for the optical receiver 110 not in a bad operating state (NO at 702), the operations can continue to 704.

At 704, the controller 140 determines the high and low target voltage swing peak values characterizing the voltage swing peak range desired by the DSP 160, referred to herein as the external voltage swing peak range or, more generally, the upper and lower bounds of the DSP window based on/from the information provided to the controller 140 from the external controller 170. At 706, the controller performs a comparison between the external voltage swing peak value obtained from the DSP 160/external controller 170 to the DSP window bounds to determine whether the external voltage swing peak value is within the range of the DSP window bounds (IN RANGE) or is outside the range of the DSP window bounds (OUT OF RANGE).

Upon determining that the external voltage swing peak value obtained from the DSP 160/external controller 170 is within the bounds of the DSP window (IN RANGE at 706), the operations can continue to 708 at which further operations can be delayed according the first delay value of DELAY-M (e.g., no adjustments were performed for the recalibration mode operations, so a delay of 18 mS can be used) and the operations can return to 602 of FIG. 4D and the operating condition state can be checked again at 602 and subsequent operations can again be performed for the mission mode operational processing loop.

Returning to 706 of FIG. 4D, upon determining that the external voltage swing peak value obtained from the DSP 160/external controller 170 is outside the bounds of the DSP window (OUT OF RANGE at 706), such that the method can continue to perform tuning algorithm operations, as shown in FIG. 4E, using the external voltage peak swing value and the DSP window obtained from the DSP 160/external controller 170 in this iteration to the tuning algorithm operations.

For example, turning to FIG. 4E for this example involving the recalibration mode operations, at 802, the tuning algorithm operations can include comparing the external voltage peak swing value to the upper and lower bounds of the DSP window in order to determine whether AGC operations 810 are to be performed for increasing the voltage swing of the output signal 155 or whether AGC operations 820 are to be performed for decreasing the voltage swing of the output signal. Based on the comparison at 802, the AGC operations at either 810 or 820 can be performed as described above, however, upon completion of any adjustment to the attenuation of the VOA 122 or the fine gain of the PGA 134, the operations can return to 710 of the recalibration mode operations shown in FIG. 4D.

At 710, further operations can be delayed by either the first delay value or the second delay value of DELAY-R depending on whether an adjustment to the fine gain of the PGA 134 (first delay value) or to the attenuation of the VOA 122 (second delay value) were performed during the gain/attenuation tuning provided through the recalibration mode. Following the delay at 710, the controller 140 can measure or obtain a voltage swing output value from the peak detector 138 and set an updated target voltage swing peak value that can be used for setting new wide and narrow window ranges, as shown at 712, that can be used during further iterations of the mission mode operational processing loop, and the operations can return to 602 of FIG. 4C and the operating condition state can be checked again at 602 and subsequent operations can again be performed for the mission mode operational processing loop.

Accordingly, as shown and discussed with reference to FIGS. 4A, 4B, 4C, 4D, and 4E, various calibration mode, mission mode, and/or recalibration mode operations can be performed via controller 140 to facilitate AGC for optical receiver 110 via AGC looping operations that combine the simplicity of local control via local loop operations that can be performed by the controller 140, with the accuracy and flexibility of external ADC control that can be triggered for the controller 140. The AGC looping operations provided by the controller 140 operate to continuously optimize the SNR of the output signal 155 by controlling/managing the appropriate attenuation/gain stages of the optical receiver 110 and using independent and programmable loop update times via configurable delays for different controlled blocks in order to optimize loop speed while maintaining stability.

As one example of the optimized SNR for the output signal 155 that can be facilitated through AGC looping operations as discussed for embodiments herein, consider FIG. 5, which is a plot 900 illustrating an example behavior of the $I_{TIA\_IN}$ current signal, as shown at reference numeral 152 of FIG. 1, that can be realized through the calibration algorithm operations that can be performed by the controller 140, according to an example embodiment.

For plot 900, the left Y-axis 902 represents a range of electrical current of the $I_{TIA\_IN}$ signal (in amps (A)), the X-axis 904 represents a range of power for the input optical signal 150 to the optical receiver 110, and the right Y-axis

906 represents a range of attenuation or gain (in dB) that can be set for the VOA 122 and PGA 134 through the calibration algorithm operations.

As shown in plot 900, as the power of the optical input signal 150 varies from a small value to a larger power (from left to right along the X-axis 904), the value of the $I_{TIA\_IN}$ current signal is always linearly increasing with the input optical signal power until the VOA 122 gets control or stated differently, the VOA 122 begins to attenuate the optical input signal 150 (for increasing input signal power levels).

Consider various example waterfall plots as discussed below that illustrate example behavior of an $I_{TIA\_IN}$ current signal that can be optimized through the mixed mode tuning algorithm operations that can be performed by the controller 140, according to various example embodiments.

For example, with regard to FIG. 6A, FIG. 6A is a waterfall plot 1000, the Y-axis 1002 represents the amplitude for an input optical signal power 1010 across time, as shown on the X-axis 1004. For FIG. 6A, the input optical signal, is considered to initially be at a high power and decreases over time. Also shown in FIG. 6A, the amplitude for the power of an $I_{TIA\_IN}$ current signal 1012 that can be realized for a scenario in which VOA attenuation is first adjusted (across the VOA active period 1006) before PGA gain begins to be adjusted (starting at the PGA active period 1008). Further for FIG. 6A, it is assumed that a high VOA attenuation is initially applied to the input optical signal and a low PGA gain is initially applied for the input optical signal (e.g., following calibration mode operations).

Figure 6B:
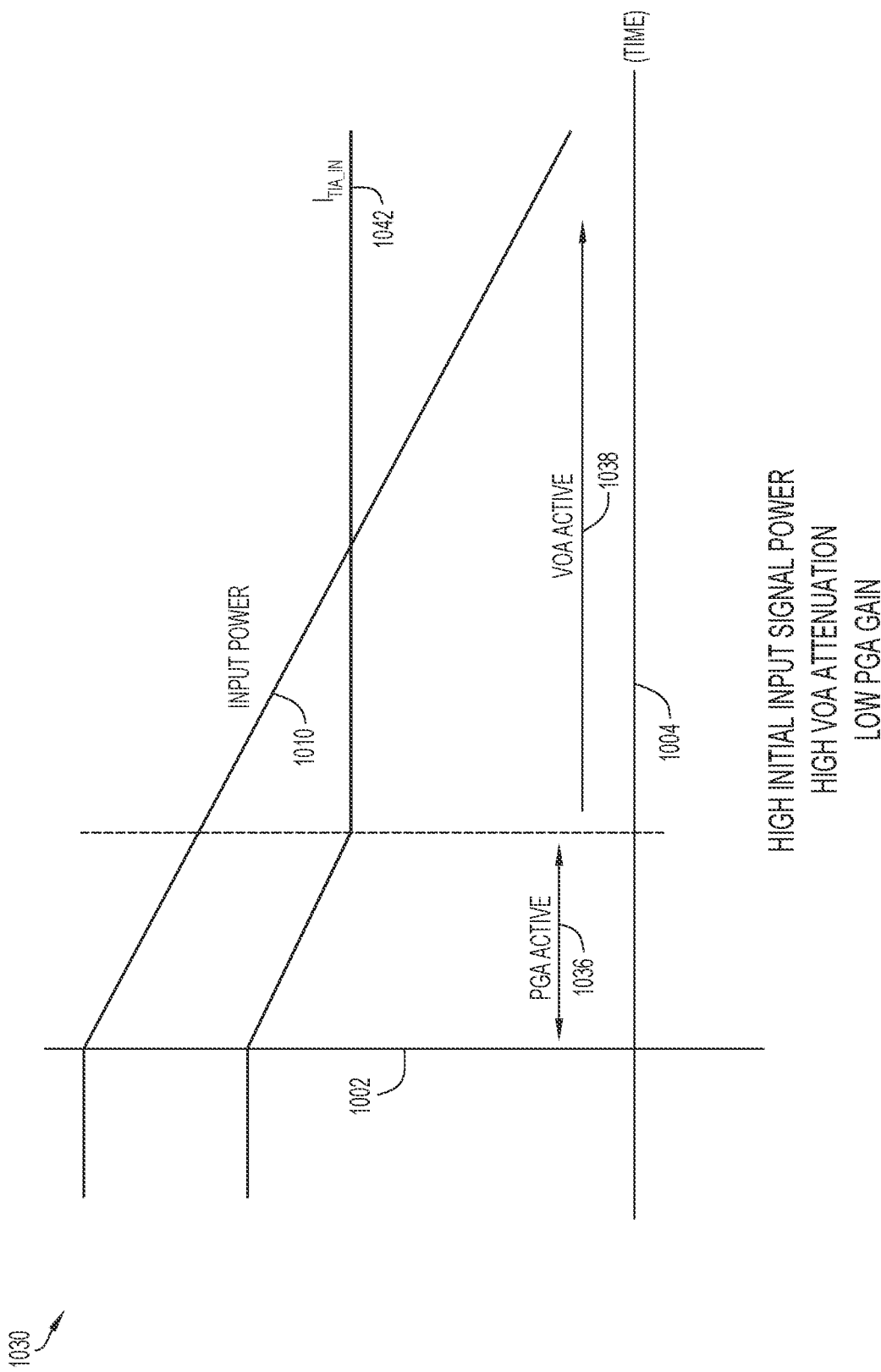

A similar scenario involving the initially high input optical signal power 1010 (of FIG. 6A) is shown in a waterfall plot 1030 for FIG. 6B. However, for the waterfall plot 1030, it is assumed that the PGA gain is adjusted first (across the PGA active period 1036) before VOA attenuation begins to be adjusted (starting at the VOA active period 1038), which results the power of an $I_{TIA\_IN}$ current signal 1042 that can be realized for the scenario of FIG. 6B.

Figure 6C:
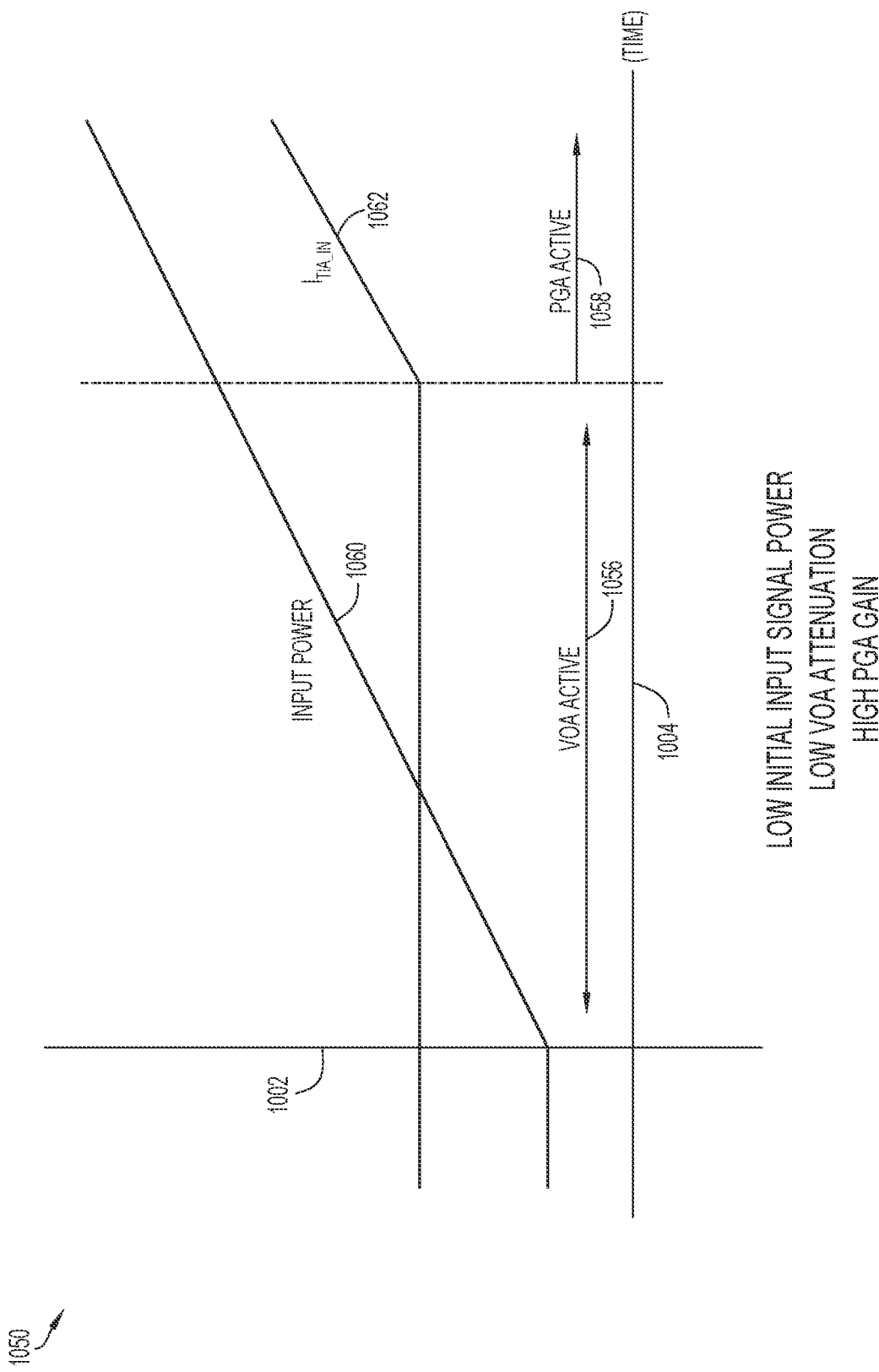
Figure 6D:
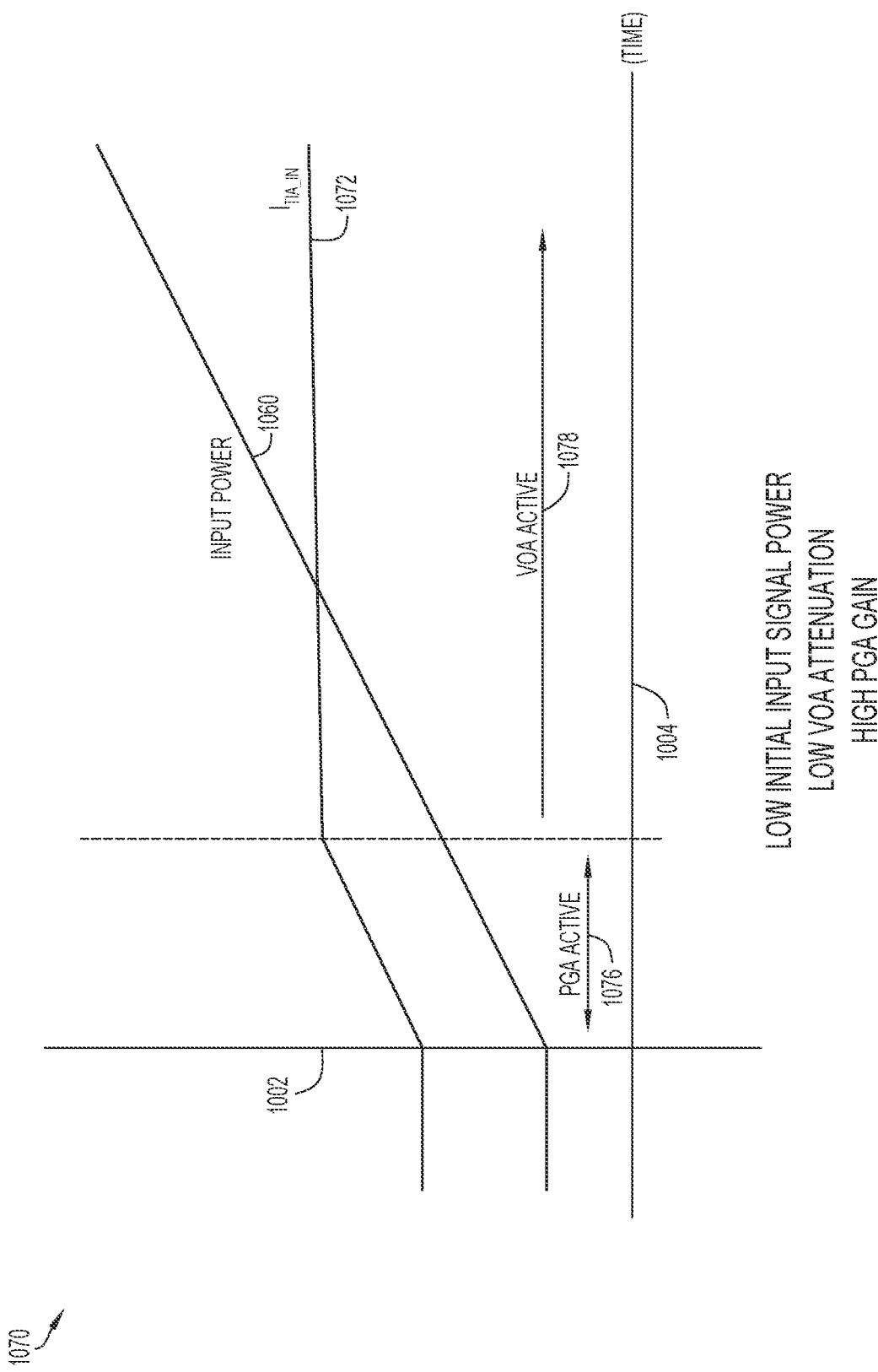

Moving to FIG. 6C, a scenario is illustrated for a waterfall plot 1050 involving an initially low input optical signal power 1060 that is assumed to increase over time, which is also shown in a waterfall plot 1070 for FIG. 6D. Similar to FIG. 6A, FIG. 6C illustrates a scenario in which VOA attenuation is first adjusted (across the VOA active period 1056) before PGA gain begins to be adjusted (starting at the PGA active period 1058). For FIG. 6C, it is assumed that a low VOA attenuation is initially applied to the input optical signal to start, and a high PGA gain is initially applied for the input optical signal (e.g., following calibration mode operations).

However, for the waterfall plot 1070 of FIG. 6D involving the initially low input optical signal power 1060 (of FIG. 6C), it is assumed that the PGA gain is adjusted first (across the PGA active period 1076) before VOA attenuation begins to be adjusted (starting at the VOA active period 1078), which results in the power for an $I_{TIA\_IN}$ signal 1072 that can be realized for the scenario of FIG. 6D.

Comparing the various waterfall plots as shown for FIGS. 6A and 6B, an area under the resultant $I_{TIA\_IN}$ signals, 1012 for FIG. 6A and 1042 for FIG. 6B, is maximized for the scenario of FIG. 6A as compared to FIG. 6B by first adjusting the attenuation of the VOA before adjusting the gain of the PGA for scenarios in which the input optical signal power is at a high power and begins to decrease over time.

However, comparing the waterfall plots as shown for FIGS. 6C and 6D, a different outcome is realized for scenarios in which the input optical signal power is at a lower power and begins to increase over time. For example, as shown in FIGS. 6C and 6D, for a low to high input optical signal power, an area under the resultant $I_{TIA\_IN}$ signals, 1062 for FIG. 6C and 1072 for FIG. 6D, is maximized for the scenario of FIG. 6D as compared to FIG. 6C by first adjusting the gain of the PGA before adjusting the attenuation of the VOA.

Thus, FIGS. 6A, 6B, 6C, and 6D illustrate that a mixed order of gain/attenuation operations can result in an optimized SNR for an output signal that can be generated by an optical receiver across different ranges of input optical signal powers, as opposed to merely applying gain/attenuation in the same order, regardless of the direction of change of the input optical signal power.

Accordingly, by providing a mixed order of operations for applying attenuation/gain across different stages of the optical receiver through the tuning algorithm operations, as discussed, for example, with reference to FIG. 4E, embodiments herein may facilitate optimizations for the output voltage signal 155 across all potential ranges of power of the input optical signal 150.

Figure 7:
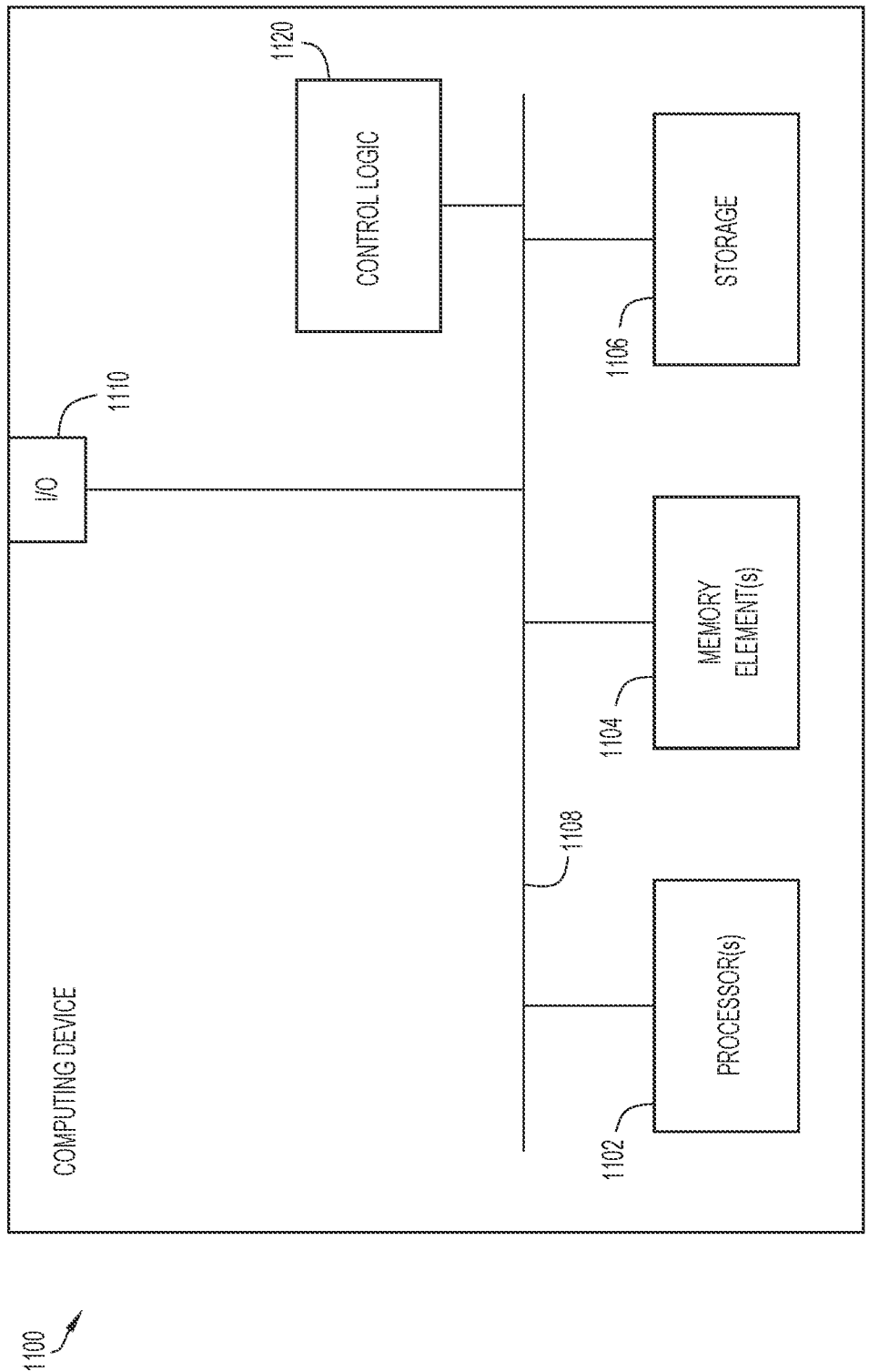
FIG. 7 illustrates a hardware block diagram of a computing device configured to perform functions associated with operations discussed in connection with embodiments herein.

Referring to FIG. 7, FIG. 7 illustrates a hardware block diagram of a computing device 1100 that may perform functions associated with operations discussed herein in connection with the techniques described for embodiments herein. In various embodiments, a computing device or apparatus, such as computing device 1100 or any combination of computing devices 1100, may be configured as any entity/entities in order to perform operations of the various techniques discussed for embodiments herein, such as controller 140 of optical receiver, external controller 170, and/or any other any elements, functions, etc. discussed for embodiments herein.

In at least one embodiment, the computing device 1100 may be any apparatus that may include one or more processor(s) 1102, one or more memory element(s) 1104, storage 1106, a bus 1108, one or more I/O interface(s) 1110, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory element(s) 1104 (or vice versa) or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

I/O interface(s) 1110 allow for input and output of data and/or information with other entities that may be connected to computing device 1100. For example, I/O interface(s) 1110 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1120) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory element(s) 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method for operating an optical receiver is provided in which the optical receiver may include a variable optical attenuator (VOA) that receives an optical input signal, a transimpedance amplifier (TIA), a programmable gain amplifier (PGA), and a controller, the method comprising: for a first operational mode, first adjusting, by the controller for the received optical input signal, at least one of: a coarse gain of the PGA, a fine gain of the PGA, or an attenuation of the VOA until a voltage swing peak value of an output signal of the optical receiver satisfies a first voltage swing peak range that is based on a target voltage swing peak value, wherein the output signal of the optical receiver is derived from an output of the PGA and the output signal is provided to an external signal processing device; and upon the voltage swing peak value of the output signal of the optical receiver satisfying the first voltage swing peak range, maintaining the coarse gain of the PGA and performing, by the controller, operations for a second operational mode, comprising: triggering second adjusting of at least one of the attenuation of the VOA or the fine gain of the PGA based on one of: determining that the voltage swing peak value of the output signal does not satisfy a second voltage swing peak range that is based on the target voltage swing peak value; or determining that an external voltage swing peak value obtained by the controller from the external signal processing device does not satisfy an external voltage swing peak range that is obtained by the controller from the external signal processing device; or maintaining the attenuation of the VOA and the fine gain of the PGA if no second adjusting is triggered for the second operational mode.

Variations and Implementations

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method for operating an optical receiver comprising a variable optical attenuator (VOA) that receives an optical input signal, a transimpedance amplifier (TIA), a programmable gain amplifier (PGA), and a controller, the method comprising:

for a first operational mode, first adjusting, by the controller for the received optical input signal, at least one of: a coarse gain of the PGA, a fine gain of the PGA, or an attenuation of the VOA until a voltage swing peak value of an output signal of the optical receiver satisfies a first voltage swing peak range that is based on a target voltage swing peak value, wherein the output signal of the optical receiver is derived from an output of the PGA and the output signal is provided to an external signal processing device; and upon the voltage swing peak value of the output signal of the optical receiver satisfying the first voltage swing peak range, maintaining the coarse gain of the PGA and performing, by the controller, operations for a second operational mode, comprising:

triggering second adjusting of at least one of the attenuation of the VOA or the fine gain of the PGA based on one of:

determining that the voltage swing peak value of the output signal does not satisfy a second voltage swing peak range that is based on the target voltage swing peak value; or determining that an external voltage swing peak value obtained by the controller from the external signal processing device does not satisfy an external voltage swing peak range that is obtained by the controller from the external signal processing device; or maintaining the attenuation of the VOA and the fine gain of the PGA if no second adjusting is triggered for the second operational mode.

2. The method of claim 1, wherein for the first operational mode, the first adjusting comprises adjusting the attenuation of the VOA before adjusting gain of the PGA.

3. The method of claim 2, wherein based on the voltage swing peak value of the output signal being less than a lower bound of the first voltage swing peak range, the first adjusting comprises decreasing the attenuation of the VOA to a smallest allowable level before increasing the gain of the PGA.

4. The method of claim 2, wherein based on the voltage swing peak value of the output signal being greater than an upper bound of the first voltage swing peak range, the first adjusting comprises increasing the attenuation of the VOA to a highest allowable level before decreasing the gain of the PGA.

5. The method of claim 1, further comprising:

for the first operational mode, determining, by the controller that the voltage swing peak value of the output signal satisfies the first voltage swing peak range for a threshold number of iterations of a first operational processing loop performed for the first operational mode before performing the operations for the second operational mode.

6. The method of claim 5, wherein:
if the coarse gain of the PGA or the fine gain of the PGA is adjusted for an iteration of the first operational processing loop, a subsequent iteration of the first operational processing loop is performed following a first delay; or
if the attenuation of the VOA is adjusted for an iteration of the first operational processing loop, a subsequent iteration of the first operational processing loop is performed following a second delay; and
the first delay is less than the second delay.

7. The method of claim 1, wherein the operations of the second operational mode are performed through a second operational processing loop and wherein:
if the fine gain of the PGA is adjusted for an iteration of the second operational processing loop, a subsequent iteration of the second operational processing loop is performed following a first delay; or
if the attenuation of the VOA is adjusted for an iteration of the second operational processing loop, a subsequent iteration of the second operational processing loop is performed following a second delay; and
the first delay is less than the second delay.

8. The method of claim 7, wherein for the operations of the second operational mode, the second voltage swing peak range is larger than the first voltage swing peak range for an initial iteration of the second operational processing loop for which the second adjusting has been triggered and, for subsequent iterations of the second operational processing loop for which the second adjusting is triggered, the second voltage swing peak range is the same as the first voltage swing peak range.

9. The method of claim 8, wherein upon triggering the second adjusting of at least one of the attenuation of the VOA or the fine gain of the PGA, the second adjusting includes decreasing the attenuation of the VOA to a smallest allowable level before increasing the fine gain of the PGA based on determining that the voltage swing peak value of the output signal is less than a lower bound of the second voltage swing peak range in which the second voltage swing peak range is the same as the first voltage swing peak range.

10. The method of claim 9, wherein upon triggering the second adjusting of at least one of the attenuation of the VOA or the fine gain of the PGA, the second adjusting includes decreasing the fine gain of the PGA to a smallest allowable level before increasing the attenuation of the VOA based on determining that the voltage swing peak value of the output signal is greater than an upper bound of the second voltage swing peak range in which the second voltage swing peak range is the same as the first voltage swing peak range.

11. The method of claim 1, wherein the external signal processing device is a digital signal processing device that receives the output signal from the optical receiver and the external voltage swing peak range is set by the digital signal processing device and obtained by the controller during the operations for the second operational mode.

12. The method of claim 11, based on determining that the external voltage swing peak value obtained from the external signal processing device does not satisfy the external voltage swing peak range, the method further comprises performing, by the controller, operations for a third operational mode, comprising:
adjusting at least one of the attenuation of the VOA or the fine gain of the PGA; and
determining an updated voltage peak swing value of the output signal of the optical receiver following a first delay or a second delay, wherein the first voltage swing peak range and the second voltage swing peak range are based on the updated voltage swing peak value.

13. The method of claim 12, wherein the first delay is utilized if the fine gain of the PGA is adjusted, the second delay utilized if the attenuation of the VOA is adjusted, and the first delay is less than the second delay.

14. An optical receiver comprising:
an optical circuit portion comprising a variable optical attenuator (VOA) connected with a photodetector, wherein the VOA receives an optical input signal;
an electrical circuit portion comprising a transimpedance amplifier (TIA) that is connected to an output of the photodetector, a programmable gain amplifier (PGA) connected to an output of the TIA, and an output driver connected to an output of the PGA that is to generate an output signal of the optical receiver that is to be provided to an external signal processing device; and
a controller that is to manage an attenuation of the VOA and at least one of a coarse gain of the PGA or a fine gain of the PGA, wherein the controller comprises at least one memory element for storing data and at least one processor for executing instructions associated with the data, wherein executing the instructions causes the controller to perform operations, comprising:
for a first operational mode, first adjusting, by the controller for the received optical input signal, at least one of: a coarse gain of the PGA, a fine gain of the PGA, or an attenuation of the VOA until a voltage swing peak value of an output signal of the optical receiver satisfies a first voltage swing peak range that is based on a target voltage swing peak value; and
upon the voltage swing peak value of the output signal of the optical receiver satisfying the first voltage swing peak range, maintaining the coarse gain of the PGA and performing, by the controller, operations for a second operational mode, comprising:
triggering second adjusting of at least one of the attenuation of the VOA or the fine gain of the PGA based on one of:
determining that the voltage swing peak value of the output signal does not satisfy a second voltage swing peak range that is based on the target voltage swing peak value; or
determining that an external voltage swing peak value obtained by the controller from the external signal processing device does not satisfy an external voltage swing peak range that is obtained by the controller from the external signal processing device; or
maintaining the attenuation of the VOA and the fine gain of the PGA if no second adjusting is triggered for the second operational mode.

15. The optical receiver of claim 14, wherein for the first operational mode, the first adjusting comprises adjusting the attenuation of the VOA before adjusting gain of the PGA.

16. The optical receiver of claim 14, wherein the operations of the second operational mode are performed through a second operational processing loop and wherein:
if the fine gain of the PGA is adjusted for an iteration of the second operational processing loop, a subsequent iteration of the second operational processing loop is performed following a first delay; or if the attenuation of the VOA is adjusted for an iteration of the second operational processing loop, a subsequent iteration of the second operational processing loop is performed following a second delay; and the first delay is less than the second delay.

17. The optical receiver of claim 16, wherein for the operations of the second operational mode, the second voltage swing peak range is larger than the first voltage swing peak range for an initial iteration of the second operational processing loop for which the second adjusting has been triggered and, for subsequent iterations of the second operational processing loop for which the second adjusting is triggered, the second voltage swing peak range is the same as the first voltage swing peak range.

18. One or more non-transitory computer readable storage media encoded with instructions that, when executed by a controller of an optical receiver, cause the controller to perform operations, comprising:

for a first operational mode, first adjusting, by the controller for a received optical input signal, at least one of: a coarse gain of a programmable gain amplifier (PGA), a fine gain of the PGA, or an attenuation of a variable optical attenuator (VOA) until a voltage swing peak value of an output signal of the optical receiver satisfies a first voltage swing peak range that is based on a target voltage swing peak value, wherein the output signal of the optical receiver is derived from an output of the PGA and the output signal is provided to an external signal processing device; and upon the voltage swing peak value of the output signal of the optical receiver satisfying the first voltage swing peak range, maintaining the coarse gain of the PGA and performing, by the controller, operations for a second operational mode, comprising:

triggering second adjusting of at least one of the attenuation of the VOA or the fine gain of the PGA based on one of:

determining that the voltage swing peak value of the output signal does not satisfy a second voltage swing peak range that is based on the target voltage swing peak value; or determining that an external voltage swing peak value obtained by the controller from the external signal processing device does not satisfy an external voltage swing peak range that is obtained by the controller from the external signal processing device; or maintaining the attenuation of the VOA and the fine gain of the PGA if no second adjusting is triggered for the second operational mode.

19. The media of claim 18, wherein for the first operational mode, the first adjusting comprises adjusting the attenuation of the VOA before adjusting gain of the PGA.

20. The media of claim 18, wherein the operations of the second operational mode are performed through a second operational processing loop and wherein:

if the fine gain of the PGA is adjusted for an iteration of the second operational processing loop, a subsequent iteration of the second operational processing loop is performed following a first delay; or if the attenuation of the VOA is adjusted for an iteration of the second operational processing loop, a subsequent iteration of the second operational processing loop is performed following a second delay; and the first delay is less than the second delay.

* * * * *